(12) United States Patent
Thames et al.

(10) Patent No.: US 6,196,772 B1
(45) Date of Patent: Mar. 6, 2001

(54) POSITIVE FEED TOOL HAVING A CLUTCH

(75) Inventors: Bruce A. Thames, Cypress, TX (US); Sam C. Jensen, Glendora, CA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 09/335,780

(22) Filed: Jun. 18, 1999

(51) Int. Cl.[7] ........................................ B23B 35/00
(52) U.S. Cl. .................. 408/1 R; 408/128; 408/137; 408/141
(58) Field of Search ................... 408/1 R, 17, 124, 408/137, 138, 141

(56) References Cited

U.S. PATENT DOCUMENTS

| | | |
|---|---|---|
| 3,577,807 | 5/1971 | Alexander et al. . |
| 3,766,990 | 10/1973 | Eckman et al. . |
| 3,767,313 * | 10/1973 | Bohoroquez et al. ............... 408/137 |
| 3,804,545 | 4/1974 | Chistov et al. . |
| 4,538,942 * | 9/1985 | Vindez ................................ 408/137 |
| 4,591,299 * | 5/1986 | Eckman ............................... 408/137 |
| 4,592,681 * | 6/1986 | Pennison et al. .................... 408/137 |
| 4,612,998 * | 9/1986 | Vindez ................................ 408/137 |
| 4,650,377 | 3/1987 | Biek . |
| 4,681,490 * | 7/1987 | Pennison et al. .................... 408/137 |
| 4,799,833 * | 1/1989 | Pennison et al. .................... 408/137 |
| 4,822,215 * | 4/1989 | Alexander ........................... 408/138 |
| 4,850,753 | 7/1989 | Dudden . |
| 5,062,745 * | 11/1991 | Eckman ................................ 408/15 |
| 5,143,161 * | 9/1992 | Vindez ................................ 408/137 |
| 5,149,232 * | 9/1992 | Eckman ................................ 408/17 |
| 5,295,770 * | 3/1994 | Pennison et al. ..................... 408/17 |

FOREIGN PATENT DOCUMENTS

| | | | |
|---|---|---|---|
| 1752834B2 * | 6/1978 | (DE) | ................. 408/141 |
| 0 169 109 | 1/1986 | (EP) . | |
| 0 343 622 | 11/1989 | (EP) . | |
| 1 554 169 | 10/1979 | (GB) . | |

* cited by examiner

Primary Examiner—A. L. Wellington
Assistant Examiner—Monica S. Carter
(74) Attorney, Agent, or Firm—Coats & Bennett, PLLC

(57) ABSTRACT

An apparatus and method for limiting the transmission of power from a motor to a spindle of a positive feed drill when a high torque situation develops, as well as an apparatus and method for causing the spindle to automatically retract when the high torque situation develops.

27 Claims, 15 Drawing Sheets

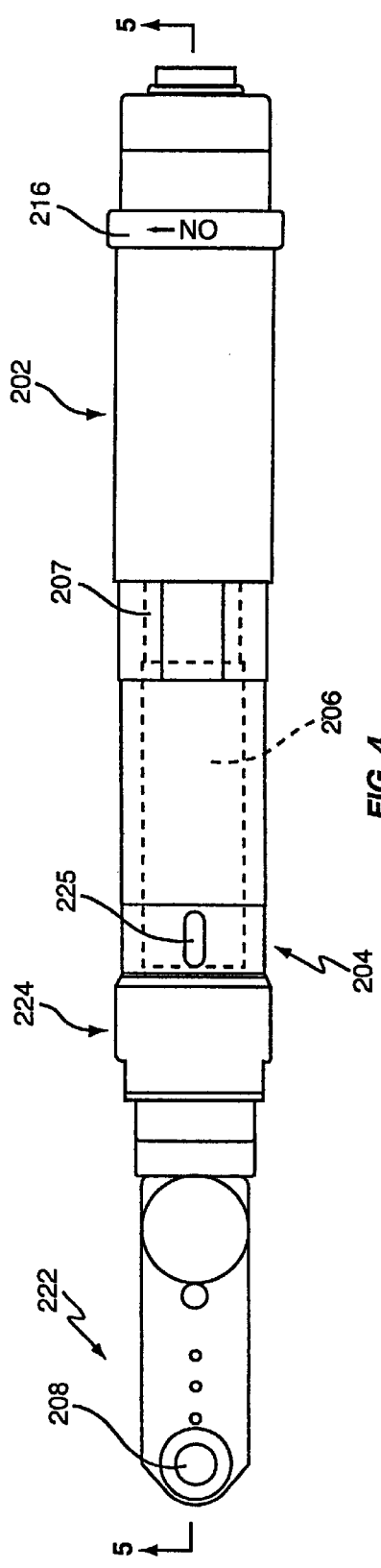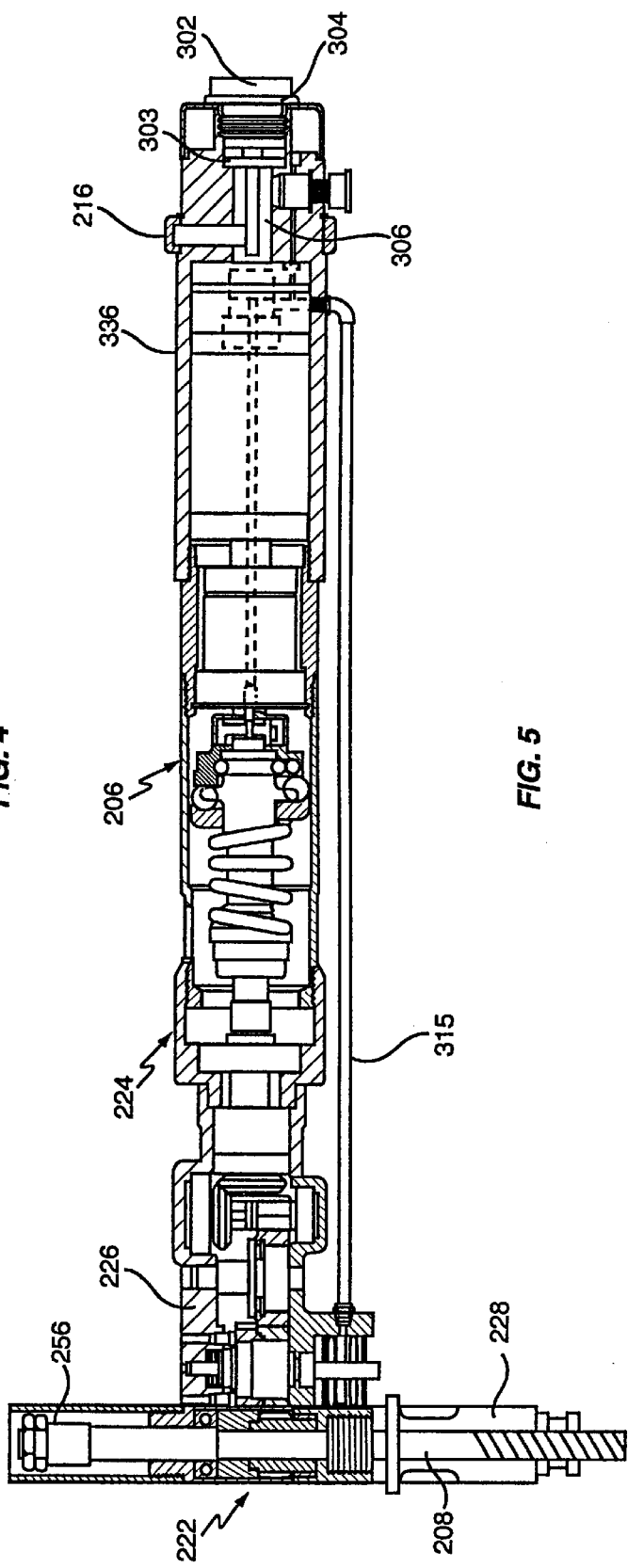
FIG. 4
FIG. 5

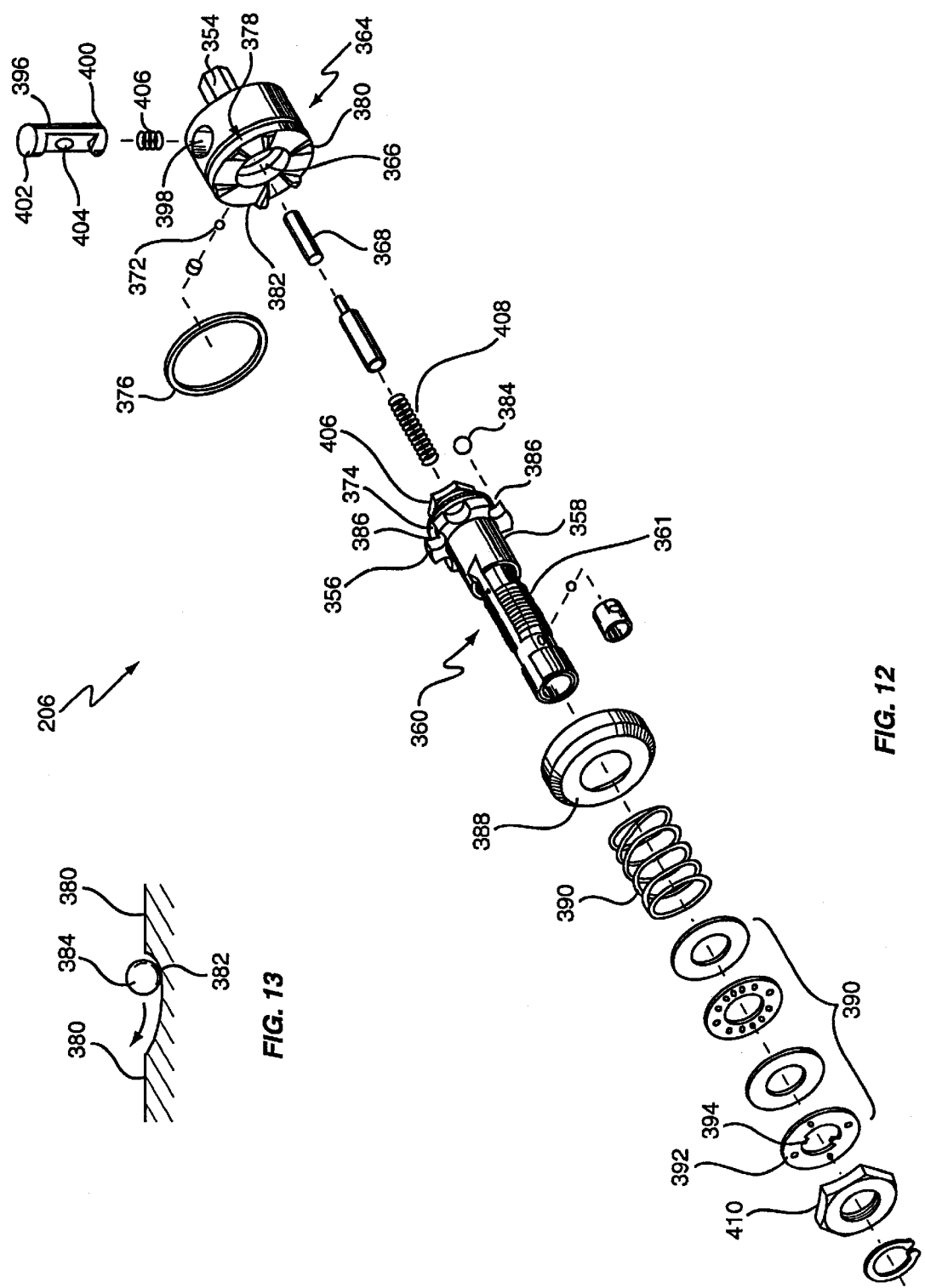

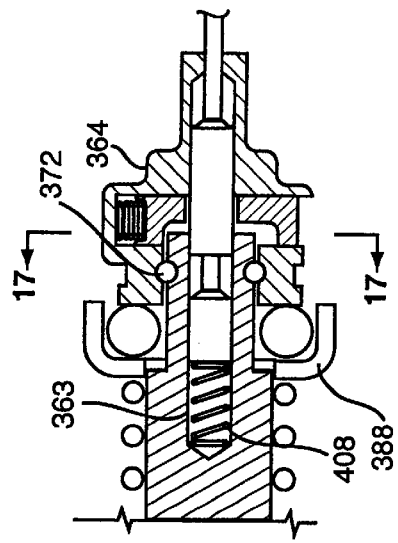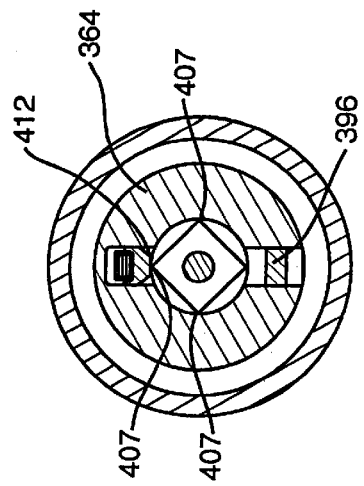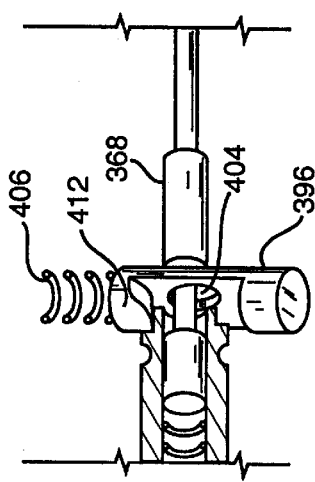

POSITIVE FEED TOOL HAVING A CLUTCH

BACKGROUND OF THE INVENTION

1. Field of the Invention

The present invention relates to positive feed tools, such as right angle positive feed drills, and more particularly, to a method and apparatus for limiting the transmission of power along a drive train of such tools and for causing the spindle of such tools to automatically retract when torque on the spindle or in the drive train exceeds a predetermined value.

2. Description of the Related Art

Positive feed tools, such as positive feed drills, are conventionally known for drilling holes in workpieces formed of substances, such as steel, aluminum, titanium, and composites. Positive feed drills include a drill feed mechanism that feeds a drill bit into the workpiece.

FIG. 1 illustrates an example of a conventional positive feed drill, specifically a right angle positive feed drill 10 that is coupled to a cutter 12. The positive feed drill 10 generally includes a spindle 28 that, in addition to rotating, advances a predetermined amount per revolution toward the workpiece to be drilled. Conventional applications for positive feed drills include, among other applications, drilling holes in various parts of aircraft.

The right angle positive feed drill 10 includes an air motor 14. The air motor 14 is powered by a pressurized air source (not illustrated). As described below, the air motor 14 causes the spindle 28 to rotate. The spindle 28 is caused to rotate and feed by rotating the spindle drive gear 18 and spindle feed gear 20 with a differential feed gear 24 and differential drive gear 26. The spindle feed gear 20 includes internal threads that are threaded on the external threads 27 extending along the length of the spindle 28. Hence, when the spindle feed gear is rotated in relation to the spindle 28, the spindle will feed through the spindle feed gear. External threads 27 of the spindle 28 illustrated in FIG. 1 are left-handed threads. The spindle 28 also includes drive grooves 30 that extend along the length of the spindle 28. The spindle drive gear 18 includes internal male splines (not illustrated in FIG. 1) that engage with the drive grooves 30 on the spindle 28. Thus, when the spindle drive gear 18 is rotated, the spindle 28 also rotates.

When the air motor 14 is actuated, spindle drive gear 18 is caused to rotate, which will turn the spindle 28 due to the engagement of the internal male splines with the drive grooves 30. In forward operation, or the drilling mode, the air motor 14 turns in a clockwise direction (as viewed from the rear of the tool 10), which turns a motor spindle 16. The series of gears 32, 34, 38, 40, 26 connect the motor spindle 16 with the spindle 28. More specifically, rotation of the motor spindle 16 will rotate the pinion 32, which in turn drives the gear 34, which is pinned or keyed to a shaft 36. The spur pinion 38 drives the idler gear 40, which drives the differential drive gear 26. In forward drill mode, the differential drive gear 26 is coupled to the differential feed gear 24 so that they turn in unison. The differential drive gear 26 is also engaged with the spindle drive gear 18. Because the spindle drive gear 18 is engaged with the spindle 28 via the drive grooves 30, the rotation of the differential drive gear 26 is transferred to the spindle 28. However, the spindle 28 is permitted to move longitudinally through the spindle drive gear 18 because of the drive grooves 30.

The spindle feed gear 20, which is threaded on the spindle 28, is driven by the differential feed gear 24 while in the forward position, as shown in FIG. 1. The spindle feed gear 20 threads the spindle 28 through the spindle drive gear 18 and feeds it toward the workpiece. Because a differential exists between the spindle drive gear 18 and the spindle feed gear 20, the spindle 28 is rotated and will advance toward the workpiece. The desired feed rate is obtained by the differential gear ratio between the spindle drive gear 18 and the spindle feed gear 20. In sum, when the air motor 14 is actuated, the spindle drive gear 18 rotates, which turns the spindle 28. When the spindle feed gear 20 is rotated faster than the spindle 28, the spindle will feed, causing downward motion of the spindle. Conversely, when the spindle feed gear 20 rotates slower than the spindle 28, the spindle 28 will retract upward.

The right angle positive feed drill 10 also includes a feed stop collar 42 and a feed engagement lever 44. At the completion of the advancement of the spindle 28, or at the completion of the drilling cycle, the feed stop collar 42 contacts the feed engagement lever 44. This contact lifts the differential feed gear 24 away from the differential drive gear 26 and locks it so that it does not rotate. Because the differential feed gear 24 is locked and is engaged with the spindle feed gear 20, the spindle feed gear 20 is also locked in a stationary position such that it does not rotate. With the spindle 28 continuing to rotate in a forward direction via rotation of the spindle drive gear 18, and the spindle feed gear 20 held stationary, the spindle 28 will retract.

As illustrated in FIG. 1, the cutter 12 includes a drill bit 45 for penetrating the surface of the workpiece to be drilled. A tool nose 46 surrounds the cutter 12, which attaches the tool to a drilling fixture offset from the workpiece to be drilled. The drill bit 45 is a tool that bores cylindrical holes.

During operation of the conventional tool illustrated in FIG. 1, it is possible that the spindle 28 will seize during operation of the air motor 14. This could occur for a variety of reasons.

For example, during drilling with the drill bit 45, the metallic chips created during the cutting operation may stick to the wall of the bored cylindrical hole and gall. This will cause the cutting chips to stick to the cutting edge of the drill bit 45, as well as the wall of the drilled hole. When this occurs, the drill bit 45 may seize in the drilled hole, which naturally causes the spindle 28 to seize as well. This may occur because the drill bit 45 does not have enough flutes for the release of the cutting chips.

Additionally, when the drill bit 45 breaks through a workpiece, it occasionally grabs an edge of the hole and seizes. Furthermore, because the tool nose 46 surrounds the drill bit 45, chips from the drilling operation tend to pack in the tool nose 46 to such an extent that the drill bit 45 seizes.

It is particularly problematic when the drill bit 45 or the spindle 28 of the right angle positive feed drill 10 seizes. During operation of the drill 10, the air motor 14 is supplying power through the gear train to the spindle 28. When the spindle 28 seizes while the motor 14 is attempting to drive the spindle 28, a high torque situation inevitably results in the positive feed drill 10, which will cause the air motor 14 to seize, or damage one or more of the gears, bearings, and shafts in the drill 10. For example, if the spindle 28 seizes during normal drilling with the drill bit 45, the spindle 28 and/or any one of the pinions and gears may strip or completely break and damage the tool 10.

One conventional right angle positive feed drill 10 similar to that illustrated in FIG. 1 has the ability to rapidly advance the drill bit 45 from a retracted position to a position near the workpiece. This feature is not used to drill holes, but to merely cause the drill bit 45 to advance quickly toward the workpiece. This rapid advance feature is disclosed in both U.S. Pat. No. 4,799,833 and U.S. Pat. No. 4,591,299 and is achieved as follows.

With the spindle 28 retracted upwardly, the air motor 44 is reversed. With the differential feed gear 24 located in the upward position where it is locked so that it does not engage with the differential drive gear 26, the spindle feed gear 20 is also stopped and does not rotate. With the motor 14 running in reverse, the spindle drive gear 18 rotates the spindle through the internal threads of the spindle feed gear 20 in a reverse direction. This will cause the spindle 28 to rapidly advance toward the workpiece.

In another conventional right angle positive feed drill similar to that illustrated in FIG. 1, the drill includes a clutch that will slip or disengage when the drill encounters excessive torque during a rapid advance cycle with the motor running in reverse. The clutch is of a conventional type and is oriented perpendicular to an axis of the air motor. See U.S. Pat. No. 4,799,833. However, this clutch is configured to only trip when the air motor 14 is operating in reverse and the spindle is rapidly advancing toward the workpiece. Thus, when the air motor is rotating in the normal forward direction to feed the spindle 28 toward the workpiece during normal drilling, the clutch of the conventional right angle positive feed drill will not slip or disengage when the drill encounters excessive torque during the drilling cycle. Hence, with this conventional drill, the spindle, gears, shafts, bearings, or other portions of the drill may be damaged during the drilling operation should a high torque situation occur, such as when the drill bit seizes.

Even more problematic, some conventional positive feed drills do not include an automatic retract mechanism. With these tools, when the depth stop 42 bears down against the housing of the drill, the spindle teeth or the gear teeth may strip. Hence, an operator of such drills must continuously monitor the operation of the drill to ensure that the depth stop does not torque on the housing of the tool.

To address the above-described problems, some positive feed drills include a shear pin in the tool that will shear when the tool is subjected to excessive torque. This approach to solving the above problems is problematic because the shear pin does not always function reliably and must be replaced before the tool can be used again.

Thus, it is apparent that conventional positive feed drills are particularly vulnerable to being damaged when subjected to a high torque situation during drilling. These positive feed drills may be permanently damaged if the operator does not immediately cause the drill bit 44 to retract when a high torque situation occurs during drilling. Hence, an operator of conventional positive feed drills must continuously monitor the drilling operation to determine whether or not a high torque situation could possibly occur, and when this is observed, stop the drill and remedy the situation. However, it is very difficult for an operator to determine when a high torque situation is developing and thus when the drill should be shut down.

From the foregoing, it is apparent that the above-described constraints and problems associated with conventional positive feed tools has created a need for a positive feed tool having a clutch that will trip in response to a high torque situation during drilling, as well as a positive feed drill that automatically retracts the spindle away from the workpiece in response to the high torque situation.

SUMMARY OF THE INVENTION

Generally speaking, the present invention provides an apparatus and method for limiting the transmission of power from an air motor to the spindle of a positive feed drill when a high torque situation develops, as well as an apparatus and method for causing the spindle to automatically retract when the high torque situation develops.

According to one aspect of the present invention, a positive feed tool includes a threaded spindle, a motor, and a drive train that rotatably connects the motor and the threaded spindle. The drive train at least includes: a spindle drive gear coupled to the spindle such that the spindle and the spindle drive gear rotate together; a spindle feed gear threaded on the spindle; a differential drive gear engaged with the spindle drive gear; a differential feed gear engaged with the spindle feed gear; and a clutch. At least one of the differential feed gear and the differential drive gear is moveable from a first position to a second position. The differential feed gear is coupled to the differential drive gear when the one of the differential feed gear and the differential drive gear is located at the first position such that the differential feed gear and the differential drive gear rotate together. The differential feed gear is not coupled to the differential drive gear when the one of the differential feed gear and the differential drive gear is located at the second position. The clutch limits transmission of power from the motor along the drive train when torque on the spindle or in the drive train exceeds a predetermined value and when the one of the differential feed gear and the differential drive gear is located at the first position.

According to another aspect of the present invention, a positive feed tool includes a spindle, a motor, and a drive train rotatably connecting the motor and the spindle. The tool further includes means for causing the spindle to retract when torque on the spindle or in the drive train exceeds a predetermined value.

In accordance with another aspect of the present invention, a method in a positive feed tool includes feeding a spindle while a differential feed gear is engaged with a differential drive gear. The spindle is retracted by automatically disengaging at least one of the differential feed gear and the differential drive gear from the other of the differential feed gear and the differential drive gear when an amount of torque on the spindle or in the drive train exceeds a predetermined value and causes a clutch to limit transmission of power from the motor along the drive train.

Another aspect of the present invention involves a positive feed tool having a threaded spindle, a motor, and a drive train that rotatably connects the motor and the threaded spindle. The drive train at least including: a spindle drive gear coupled to the spindle such that the spindle and the spindle drive gear rotate together; a spindle feed gear threaded on the spindle; a differential drive gear engaged with the spindle drive gear; a differential feed gear engaged with the spindle feed gear; and a clutch. At least one of the differential feed gear and the differential drive gear is moveable from a first position to a second position. The differential feed gear is coupled to the differential drive gear when the one of the differential feed gear and the differential drive gear is located at the first position such that the differential feed gear and the differential drive gear rotate together. The differential feed gear is not coupled to the differential drive gear when the one of the differential feed gear and the differential drive gear is located at the second position. The clutch limits transmission of power from the motor along the drive train. The clutch is operatively associated with the differential feed gear to move the one of the differential feed gear and the differential drive gear from the first position to the second position when the clutch limits transmission of power from the motor along the drive train.

A further aspect of the present invention pertains to a positive feed tool having a spindle, a motor, and a drive train rotatably connecting the motor and the spindle. The drive train includes a device for preventing transmission of power from the motor along the drive drain when torque on the spindle or torque in the drive train exceeds a predetermined value during feeding of the spindle.

Yet another aspect of the present invention pertains to a method in a positive feed tool. The method includes feeding a spindle while a differential feed gear is engaged with a differential drive gear, and limiting transmission of power from a motor along the drive train when an amount of torque on the spindle or in the drive train exceeds a predetermined value and when the differential feed gear is engaged with the differential drive gear.

Still a further aspect of the present invention concerns a method in a positive feed tool. The method involves feeding a spindle while a differential feed gear is engaged with a differential drive gear, and retracting the spindle by pneumatically disengaging a differential feed gear from a differential drive gear when an amount of torque on the spindle or in a drive train exceeds a predetermined value and causes a clutch to limit transmission of power from the motor along the drive train.

Other objects, advantages and features associated with the present invention will become readily apparent to those skilled in the art from the following detailed description. As will be realized, the invention is capable of other and different embodiments, and its several details are capable of modification in various obvious aspects, all without departing from the invention. Accordingly, the drawings and the description are to be regarded as illustrative in nature, and not limitative.

BRIEF DESCRIPTION OF THE DRAWINGS

FIG. 4 is a top view of the right-angle positive feed drill illustrated in FIG. 3.

FIG. 5 is a partial sectional view of the right-angle positive feed drill taken along the line 5—5 of FIG. 4.

FIG. 12 is an exploded assembly view of the clutch of the right-angle positive feed drill illustrated in FIG. 3.

FIG. 13 is a partial sectional view of a ball rolling up a cam of the clutch illustrated in FIG. 12.

FIG. 15 is a partial sectional view of the plunger of the clutch illustrated in FIG. 12, where the clutch located in its unactuated position such that it prevents the trip rod of the tool from actuating.

FIG. 16 is a partial sectional view of the clutch illustrated in FIG. 12, where the plunger of the clutch has been actuated to permit the trip rod to move.

FIG. 17 is a partial sectional view taken along the line 17—17 of FIG. 16.

DETAILED DESCRIPTION OF THE PREFERRED EMBODIMENT

The present invention relates to a method and apparatus for causing a positive feed tool to automatically retract in response to a high torque situation. The present invention also relates to a method and apparatus for limiting the transmission of power from a motor of the positive feed tool along the drive train of the positive feed tool when the high torque situation occurs.

Figure 2:
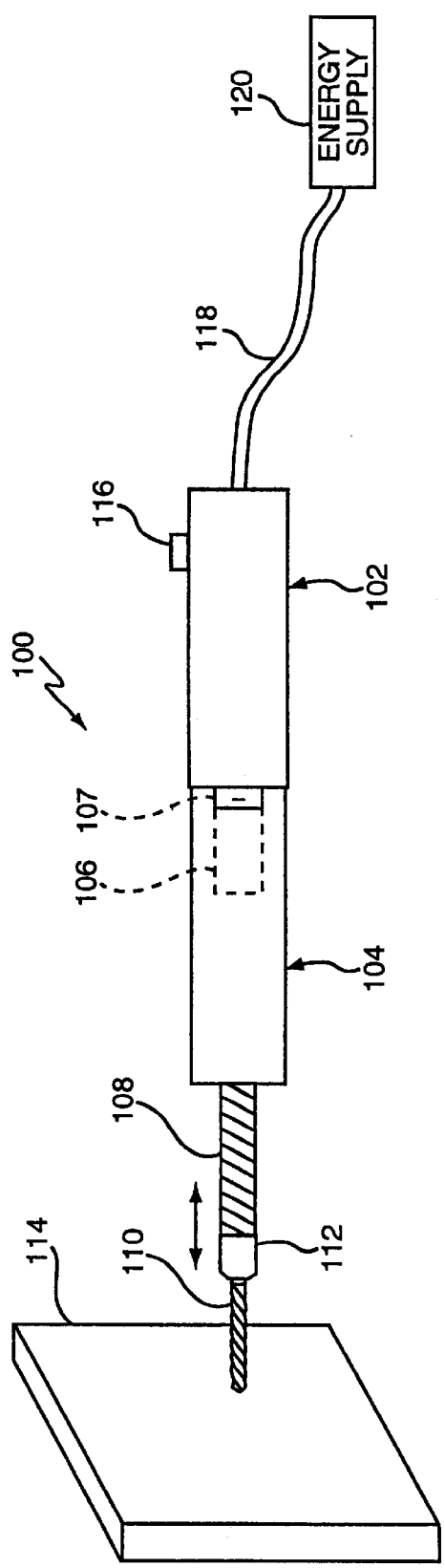
FIG. 2 is a view of an in-line positive feed drill according to one embodiment of the present invention.

According to one embodiment of the present invention, a positive feed tool, specifically a positive feed drill 100, is illustrated in FIG. 2. The positive feed tool 100 is an in-line positive feed drill. However, the positive feed tool may also be a right angle positive feed drill, similar to those described in U.S. Pat. Nos. 4,799,833 and 4,591,299, the entire disclosures of which are hereby incorporated by reference.

Figure 1:
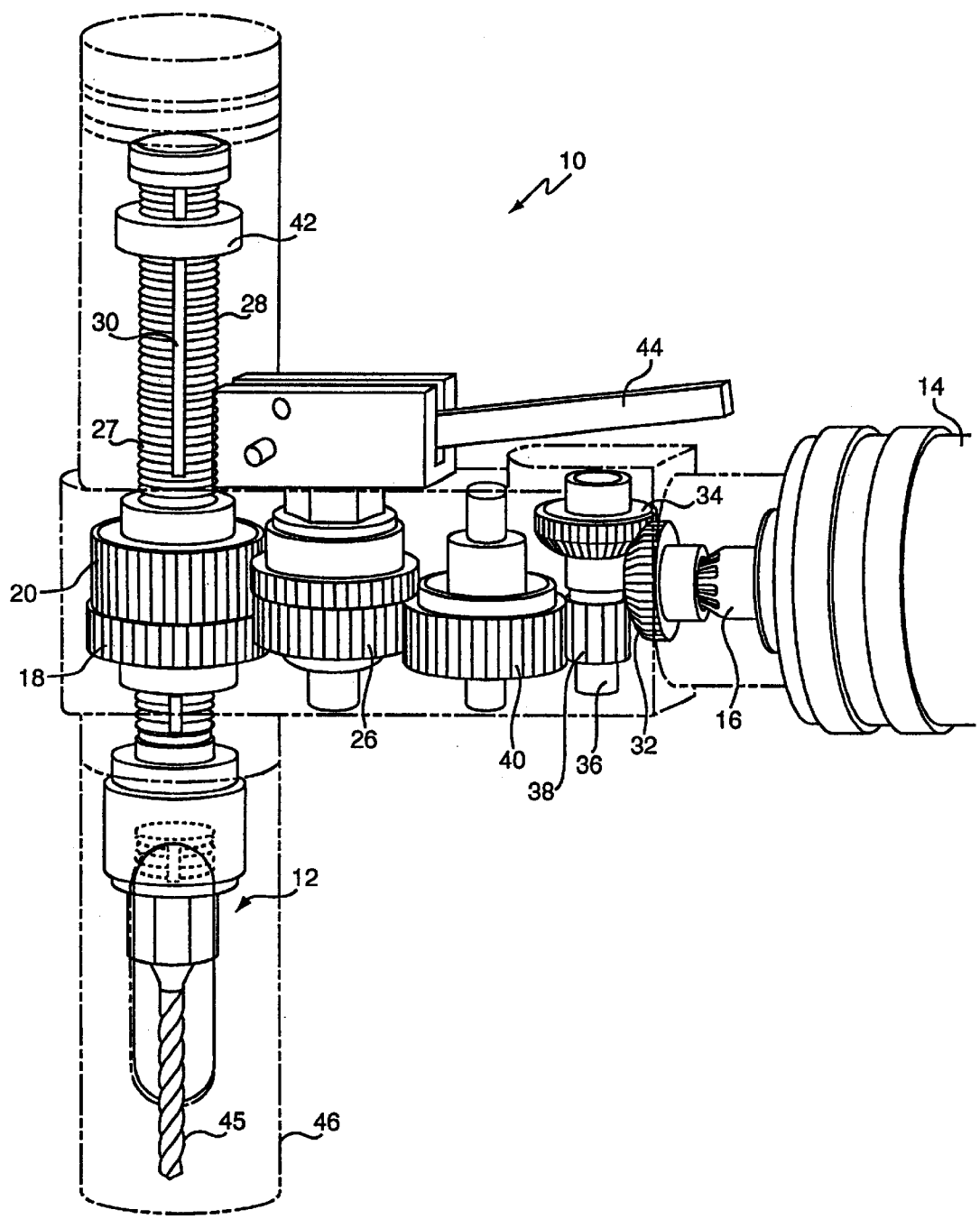
FIG. 1 is a partial operational view of a conventional right angle positive feed drill.

The positive feed drill 100 is essentially a tool for boring holes or reaming holes in a workpiece 114. A feature of the positive feed drill 100 is that it is configured to advance a spindle 108 away from the body of the tool, i.e., toward the workpiece 114, while the spindle 108 is rotating. This is achieved in a manner similar to that described above in reference to the conventional drill 10 illustrated in FIG. 1.

The positive feed drill 100 includes a motor 102, such as a liquid driven motor, an air driven motor, or an electric motor. Hence, the motor 102 is an engine or mechanism that converts a natural source of energy into mechanical power. Thus, the motor 102 is connected to an energy supply 120 via a line 118, such as a cable or hose. The tool 100 may be caused to operate by an operator manually actuating a throttle 116, such as a motor actuation lever or ring.

A drive train 104 rotatably connects the motor 102 and the spindle 108. The drive train 104 is essentially a transmission system from an output shaft of the motor 102 to the spindle 108. Hence, when the output shaft of the motor 102 is caused to rotate, the spindle 108 will also rotate. Because the tool 100 is a positive feed device, it also includes a feed mechanism by which the spindle may be fed to the workpiece and/or retracted from the workpiece. In this particular embodiment, the feed mechanism is part of the drive train 104.

The positive feed drill 100 further includes a cutter 110 fixed to the spindle 108. The cutter 110 can be fixed to the spindle 108 by a fixing device 112. The fixing device 112, can be a chuck, such as a four-jaw independent, a four-jaw self-center ring, a three-jaw self-center, or other types of chucks that function to fix the cutter 110 to the spindle 108. Alternatively, the cutter 110 may be fixed to the spindle 108 with a collet, a threaded connection, morse tapers, set screws, or other similar fixing devices. The fixing device 112 holds the cutter 110, which can be a cutting tool, drill bit, reamer, or other device for manipulating the workpiece 114. Because the cutter 110 is connected to the spindle 108 via the chuck 112, the cutter 110 will rotate when the spindle 108 rotates. Hence, the cutter 110 will move toward and away from a workpiece 114 with the spindle 108, as illustrated by the arrow in FIG. 2. If the cutter 110 is a drill bit, the positive feed drill 100 can be actuated by the throttle 116 such that it enters into a drilling cycle where the spindle 108 is rotated and fed toward the workpiece 114. This will cause the cutter 110 to drill a hole through the workpiece 114.

As also illustrated in FIG. 2, the positive feed drill 100 includes a torque sensitive clutch 106. The torque sensitive clutch 106 will limit transmission of power from the motor 102 along the drive train 104 when an amount of torque on the spindle 108 or in the drive train 104 exceeds a predetermined value during the feeding of the spindle 108 toward the workpiece, i.e., during a drill cycle. Hence, should the drill bit 110 seize during the drilling operation, the clutch 106 will trip so as to prevent damage to the positive feed drill 100. Additionally, the positive feed drill 100 includes an actuation device 107 that will automatically cause the spindle 108 to retract when an amount of torque on the spindle 108 or in the drive train 104 exceeds a predetermined value, preferably when the clutch limits transmission of power from the motor 102 along the drive train 104. In this embodiment, the clutch 106 is part of the actuation device 107. Thus, when drilling with the positive feed drill 100, if a high torque situation occurs, the clutch 106 will limit transmission of power from the motor 102 along the drive train 104 so as to prevent damage to the positive feed drill, and will also cause the spindle 108 to retract to further prevent the possibility of damaging the positive feed drill and to prevent undesirable results to the workpiece 114.

Figure 3:
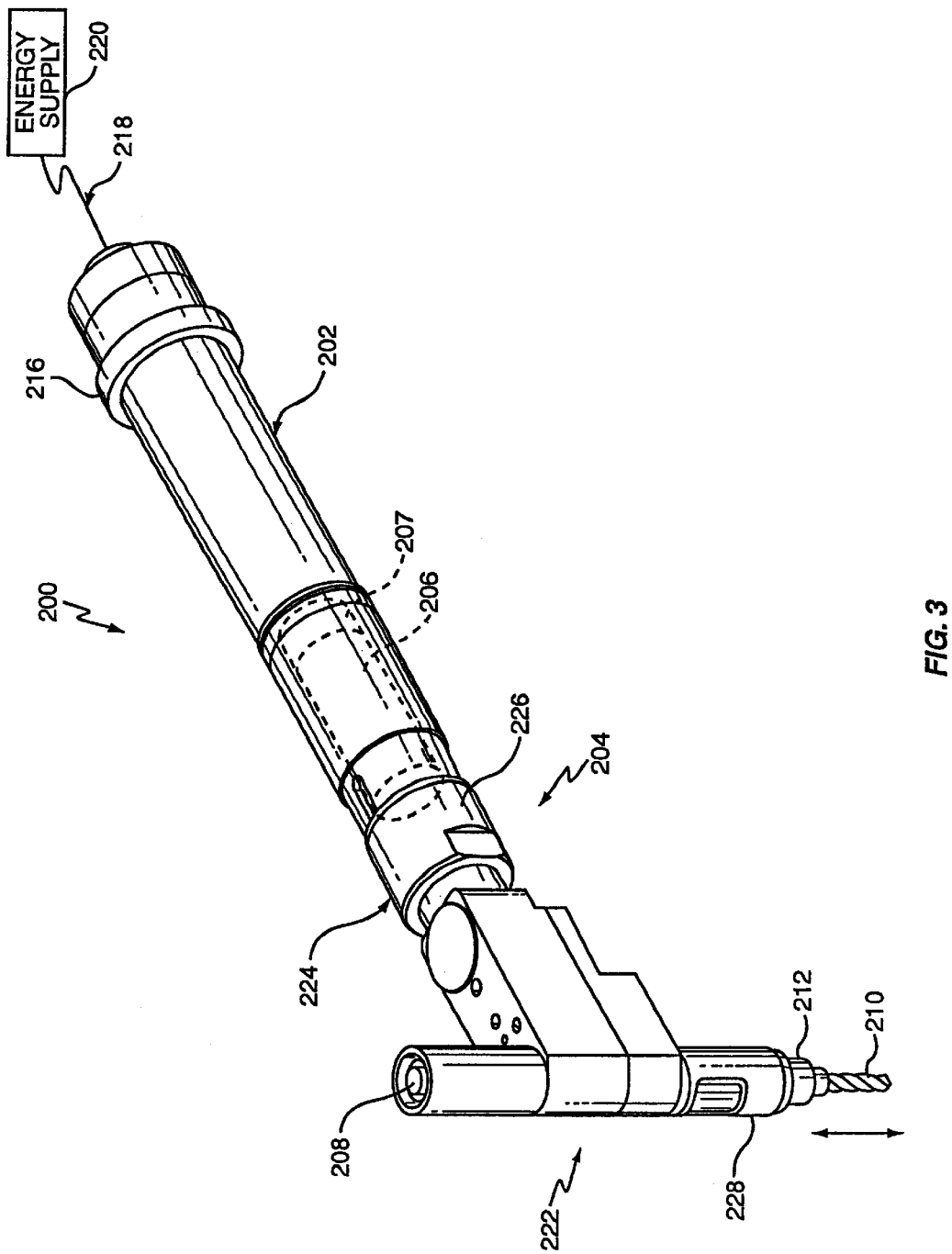
FIG. 3 is a perspective view of a right-angle positive feed drill according to another embodiment of the present invention.

FIGS. 3–17 illustrate another embodiment of a positive feed tool 200 according to the present invention. As illustrated in FIG. 3, the positive feed tool 200 is a right angle positive feed drill, and includes features similar to those of the positive feed tool 100 illustrated in FIG. 2. Hence, like reference numerals on the positive feed tool 200 refer to like parts on the positive feed drill 100, except that the reference numerals for the tool 200 been increased by one-hundred. The right angle positive feed drill 200 is essentially the same as the in-line positive feed drill 100 illustrated in FIG. 2, except that the right angle positive feed drill 200 includes a right angle positive feed drill head 222 as opposed to an in-line head.

As illustrated in FIGS. 3–5, the positive feed drill 200 is essentially a tool that bores holes or reams holes in a workpiece (not illustrated). Portions of the right angle positive feed drill 200 have been omitted from FIG. 5 for purposes of clarity. The positive feed drill 200 is configured to advance a spindle 208 away from the body of the tool while the spindle is rotating. The right angle positive feed drill 200 includes a motor 202, which is preferably a pneumatically driven motor. The motor 202, is connected to an energy supply 220 via a cable or line 218, preferably by an air line to a pressurized air source. The motor 202 may be caused to rotate by an operator actuating a throttle 216. A drive train 204 rotatably connects the motor 202 and the spindle 208. The drive train 204 is essentially a transmission system from the output shaft of the motor 202 to the spindle 208. Hence, when the shaft of the motor 202 is caused to rotate, the spindle 208 will also rotate. Because the tool is a positive feed drill it also includes a feed mechanism by which the spindle 208 may be fed to the workpiece or retracted from the workpiece, as further described below.

The positive feed drill 200 further includes a cutter 210 fixed to the spindle 208. The cutter 210 can be fixed to the spindle by a fixing device 212. Because the cutter 210 is connected to the spindle 208 via the fixing device 212, the cutter 210 will rotate when the spindle 208 rotates. Hence, the cutter 210 will move toward and away from a workpiece with the spindle 208. If the cutter 210 is a drill bit, the right angle positive feed drill 200 can be actuated by the throttle 216 such that it enters into a drilling cycle where the spindle 208 is rotated and fed toward the workpiece. This will cause the cutter 210 to drill a hole in the workpiece.

As described further below, the positive feed drill 200 also includes a clutch 206 similar to that described above in reference to the positive feed drill 100. The clutch 206 will limit transmission of power from the motor 202 along the drive train 204 when an amount of torque on the spindle 208 or in the drive train 204 exceeds a predetermined value during the normal feeding of the spindle 208 toward the workpiece. Hence, should the cutter 210 seize during the drilling operation or should the depth stop 256 (FIG. 6) bear against the housing of the tool, the clutch 206 will trip so as to prevent damage to the positive feed drill 200. Additionally, the positive feed drill 200 includes an actuation device 207 that will automatically cause the spindle 208 to retract when the amount of torque on the spindle 208 or in the drive train 204 exceeds the predetermined value, preferably when the clutch 206 limits transmission of power from the motor 202 along the drive train 204. However, the tool 200 need not include the actuation device 207 and may only include the clutch 206. The actuation device 207 may operate independently of the torque-limiting clutch 206. For instance, the tool 200 need not include the clutch 206.

During feeding of the spindle 208 with the positive feed drill 200, if a high torque situation occurs, the clutch 206 will limit transmission of power from the motor 202 along the drive train 204 so as to prevent damage to the positive feed drill. The actuation device 207 will also cause the spindle 208 to retract to further prevent the possibility of damaging the positive feed drill 200, as well as causing undesirable results to the workpiece.

As shown in FIGS. 3–5, the right angle positive feed drill 200 includes a planetary gear section 224 that is part of the drive train 204. The right angle positive feed drill 200 further includes a housing 226 that houses the internal components of the right angle positive feed drill 200. The right angle positive feed drill 200 further includes a tool nose 228 through which the spindle 208 advances and retracts during operation of the drill.

Figure 6A:
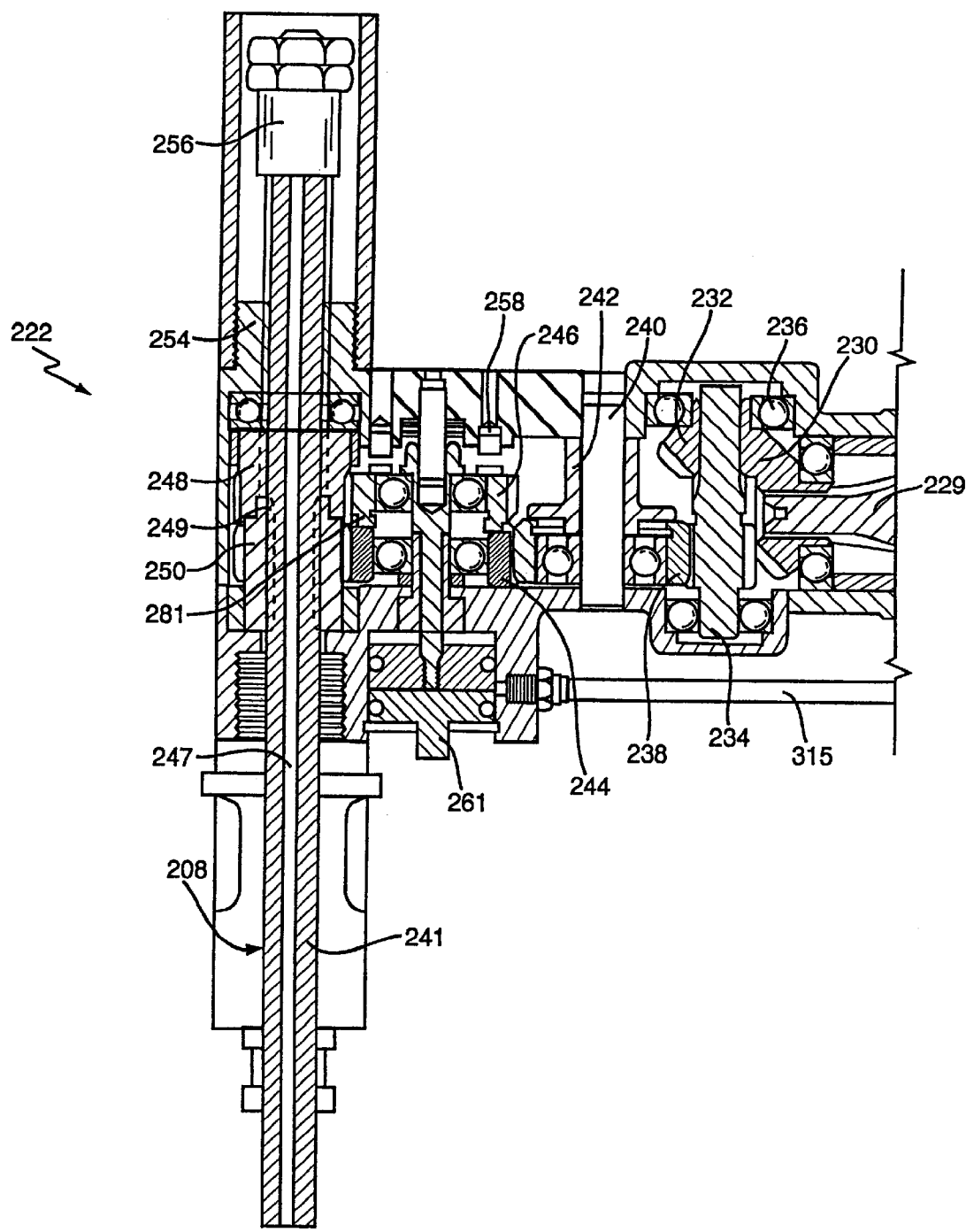
FIG. 6A is an enlarged cross-sectional view of the right-angle head of the positive feed drill illustrated in FIG. 3, where the differential feed gear is coupled to the differential drive gear.
Figure 6B:
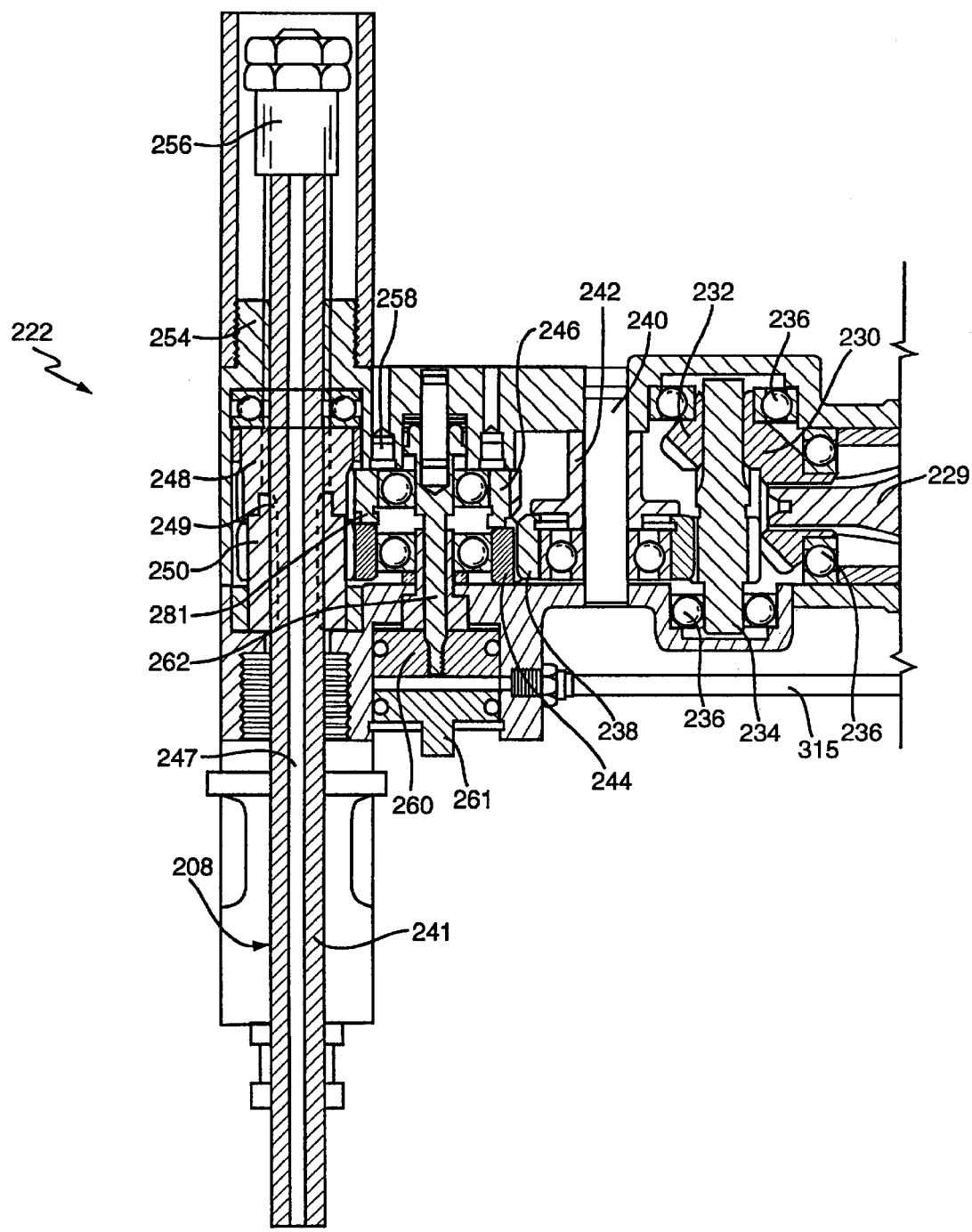
FIG. 6B is a partial sectional view of the right-angle head of the positive feed drill illustrated in FIG. 3, where the differential feed gear has been moved away from the differential drive gear such that it is no longer coupled to the differential drive gear.

FIGS. 6A and 6B illustrate an enlarged cross-sectional view of the right angle head 222 of the positive feed drill 200. The gears 230, 232, 238, 244, 246, 248, 250 illustrated in FIGS. 6A and 6B operate to rotate, feed, and retract the spindle 208. In forward operation, or in the drilling mode, the motor 202 turns in a clockwise direction (as viewed from the rear of the tool 200), and drives a shaft 229. The shaft 229 is splined at its most distal end, and drives the driving bevel gear 230, which in turn drives the driven bevel gear 232, which is pinned or keyed to a shaft and pinion 234. The shaft and pinion 234 drives an idler gear 238 which is mounted on a shaft 240 and held in place by a bearing spacer 242. The idler gear 238 drives the differential or main drive gear 244. A plurality of bearings assemblies 236 support or hold the rotating shafts and gears in their respective positions.

In forward drill mode, as illustrated in FIG. 6A, the differential drive gear 244 is coupled with the differential feed gear 246 so that they turn in unison. More specifically, the differential feed gear 246 includes a plurality of protrusions 281, such as lugs, pins, ears, or other similar items on a surface of the differential feed gear 246 that engage with recesses or similar protrusions of the differential drive gear 244 so that when the differential drive gear 244 is rotated, the differential feed gear 246 will also rotate. However, the differential feed gear 246 can also have a plurality of recesses for receiving protrusions on the differential drive gear 244 such that the differential drive gear and the differential feed gear rotate in unison.

The differential drive gear 244 is also engaged with a spindle rotation gear 250, i.e., the teeth of the respective gears are engaged. The spindle rotation gear (or spindle drive) 250 slips over the spindle 208 and is attached by keys 249, such as lugs, that are disposed in keyways 247, such as four slots or grooves formed in the exterior of the spindle. Thus, the spindle drive gear 250 is keyed to the spindle 208 such that relative rotation between the spindle drive gear 250 and the spindle 208 is prevented. This attachment allows transmission of rotational movement to the spindle 208, but permits the spindle 208 to move longitudinally through the spindle rotation gear 250.

Also mounted on the spindle 208 is a spindle feed gear 248 that has interior threads that match with exterior threads 241 of the spindle 208. Hence, the spindle feed gear 248 is threaded on the spindle 208. The spindle feed gear 248 is driven by the differential feed gear 246 while in the forward position as shown in FIG. 6A. The spindle feed gear 248 threads the spindle 208 through the spindle drive gear 250, away from the body of the tool, i.e., toward a workpiece. A rotational speed differential exists between the spindle rotation gear 250 and the spindle feed gear 248 to allow the spindle 208 to be rotated and advanced toward the workpiece.

As illustrated in FIG. 6B, to retract the spindle 208, the motor 202 remains running forward, but the differential feed gear 246 is urged upward such that it disengages from the differential drive gear 244 and is no longer coupled to the differential drive gear. The differential feed gear 246 is shown in the disengaged position in FIG. 6B, while FIG. 6A illustrates the differential feed gear 246 engaged with the differential drive gear 244 such that the differential drive gear 244 and the differential feed gear 246 rotate together. The mechanism for moving the differential feed gear 246 upward is described further below. When the differential feed gear 246 is moved upward, it is stopped from rotating and is locked in a stopped position by a plurality of protrusions 258, such as lugs or pins. In the preferred embodiment, the protrusions are pins located in cylindrical shafts in the housing 254. When the differential feed gear 246 is disengaged from the differential drive gear 244, corresponding protrusions 268 on the differential feed gear 246 interfere with the protrusions 258 in the housing 254. Hence, the differential feed gear 246 is prevented from rotating by the protrusions 258 and is thus locked in place. The protrusions 258 may be integral with the housing 254, or may be separate members, such as pins inserted in the housing. In another embodiment of the tool, the protrusions 258 are retractable. This feature is described in U.S. patent application entitled "Positive Feed Tool Having Retractable Members", filed on Jun. 18, 1999, Ser. No. 09/335,731 the entire disclosure of which is hereby incorporated by reference. Additionally, the housing 254 may have recesses for receiving the protrusions 258 on the top of the differential feed gear 246 so as to prevent the differential feed gear from rotating relative to the housing 254.

Although it is preferred that the differential feed gear 246 be moved away from the differential drive gear 244, the spindle 208 may be retracted in the other manners. For example, the differential drive gear 244 may be moved away from the differential feed gear 246 to decouple the two gears. Likewise, the differential feed gear 246 and the differential drive gear may be both moved away from each other to decouple the two gears to cause the spindle 208 to retract.

Because the differential feed gear 246 is prevented from rotating when disengaged from the differential drive gear 244, the spindle feed gear 248 also stops turning, which causes the spindle 208 to rotate through the internal threads of the spindle feed gear 248 and retract away from the workpiece.

Figure 7:
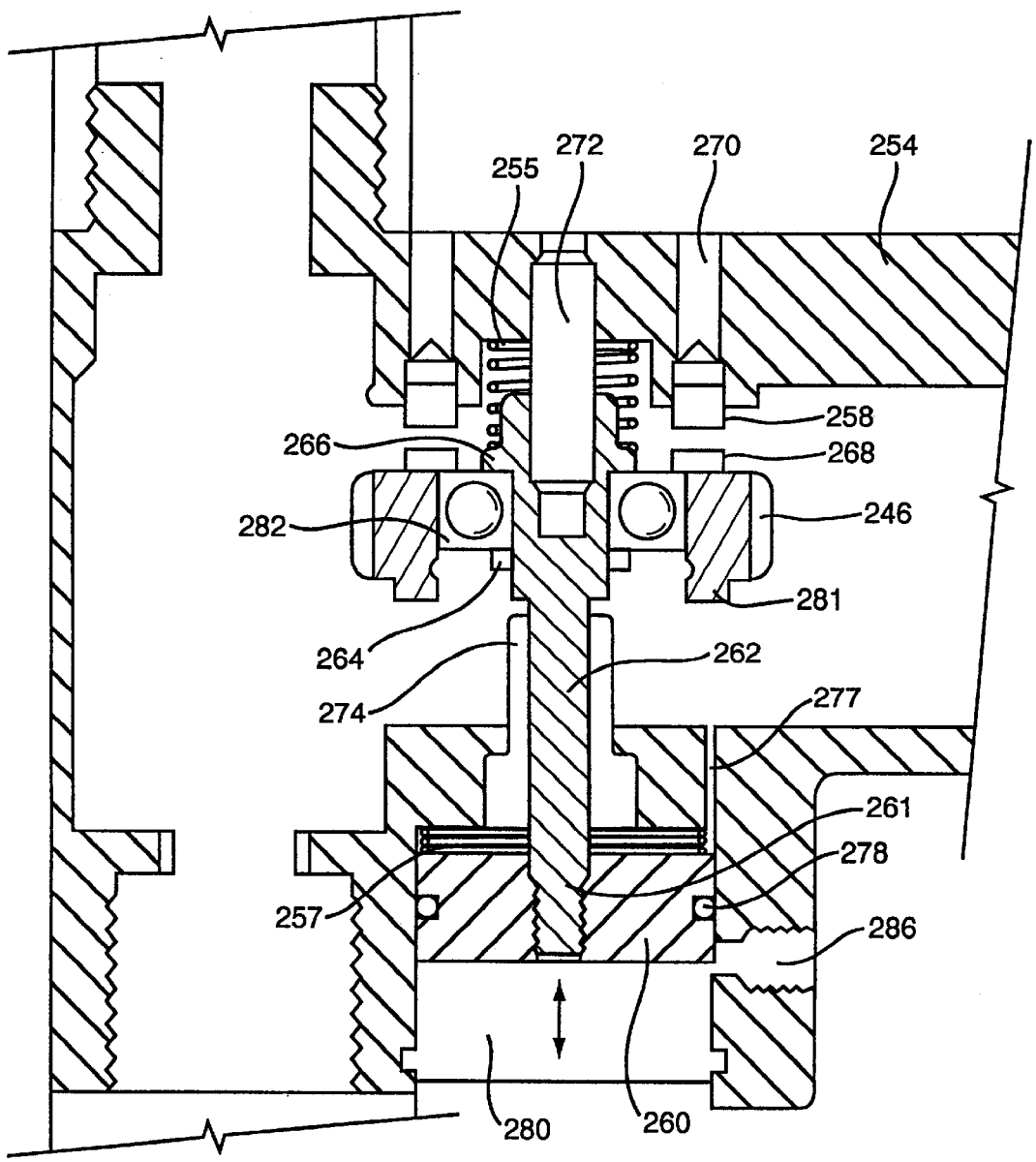
FIG. 7 illustrates a partial sectional view of the right-angle head of the right-angle positive feed drill illustrated in FIG. 3.

FIG. 7 illustrates in greater detail the device that acts on the differential feed gear 246 to disengage it from the differential drive gear 244. As is apparent from FIG. 7, a number of items have been omitted from the right angle positive feed drill 200 for purposes of clarity. As illustrated in the FIG. 7, the differential feed gear 246 is mounted on a retract shaft 262 by a bearing assembly 282. Hence, the differential feed gear 246 is rotatable about the retract shaft 262. However, the differential feed gear 246 is retained in place along the longitudinal axis of the shaft 262 by a retaining ring 264 and edge of a head 266 of the shaft 262. That is, the differential feed gear 246 is not movable along the length of the shaft 262, even though it is rotatable about the longitudinal axis of the shaft 262. The shaft 262 extends parallel with the longitudinal axis of the spindle 208, and is movable with respect to the head housing 254. Because the differential feed gear 246 is rotatably mounted to the shaft 262 in the above-described manner, when the shaft 262 moves with respect to the housing 254 in the direction indicated by the arrow in FIG. 7, the differential feed gear 246 correspondingly moves.

The differential feed gear 246 is located toward the distal end or head end of the shaft 262. The shaft 262 also includes a threaded portion 261 located at the proximal end of the shaft opposite from the distal end having the head 266. A piston 260 is threaded on the threaded portion 261 of the shaft 262. The piston 260 is a solid or hollow cylindrical plunger that is moveable in a cylinder 280 when subjected to pressurized fluid. Because the piston 260 is connected to the shaft 262, when the shaft 262 moves, the piston 260 also moves. As depicted in FIGS. 6A, 6B, and 7, the piston 260 is located within a cylindrical bore 280 located in the housing 254. The cylinder 280 and piston 260 could also be located external of the housing 254.

The retract shaft 262 slides in a stationary collar 274. As shown in FIG. 6, the bearing assembly for the differential drive gear 244 is mounted to the collar 274. Hence, when the shaft 262 moves, it will move the differential feed gear 246 relative to the differential drive gear 244 and the collar 274.

The piston 260 includes a recess for receiving a seal 278. The seal 278 defines a movable seal with the interior bore of the housing 280. For example, the piston 260 may include a recess that receives an O-ring that defines a movable seal with the cylindrical interior surface of the housing bore 280. The housing 254 also includes a channel 286 that communicates with the interior of the bore 280. As described further below, pressurized fluid may be supplied to the interior of the cylinder 280 via the channel 286.

As shown in FIG. 6A and 6B, the bottom or lower portion of the bore 280 is sealed off by a cap 280a, which is held in place by a ring. When pressurized fluid is supplied to the interior of the cylinder 280, the piston 260 is forcibly moved toward the protrusions 258 in the housing, i.e., in the direction away from the differential drive gear 244. The cylinder 280 includes a small vent 277 (see FIG. 7) located above the piston 260 through which fluid between the piston and the housing may escape to atmosphere when the piston is moved in the above-described manner.

The piston 260 is biased to move in a direction away from the protrusions 258, i.e., in the feed direction, by the springs 255, 257. The springs 255, 257 assist in keeping the differential feed gear 246 engaged with the differential drive gear 244 when the piston 260 is not actuated. When the piston 260 is actuated, the pressurized fluid in the bore 280 overcomes the force of the springs 255, 257 to cause the piston 260 to move. Because the piston 260 is connected to the shaft 262, when the piston 260 moves, the shaft 262 and the differential feed gear 246 will also move. The head 266 of the shaft 262 includes a recess that slidably receives a guide pin 272. The guide pin 272 is mounted in the housing 254 and prevents the shaft 262 from moving away from an axis parallel with the spindle axis 208. Thus, the shaft 262 will slide with respect to the guide pin 272 when the piston 260 is actuated. In the above-identified manner, the differential feed gear 246 may be caused to move away from the differential drive gear 244 such that the protrusions 268 on the differential feed gear 246 engage with the protrusions 258 mounted in the housing 254 and cause the differential feed gear 246 to stop rotating. As described earlier, when the differential feed gear 246 is prevented from rotating and is disengaged from the differential drive gear 244, the rotating spindle 286 will retract through the spindle drive gear 250.

Figure 8:
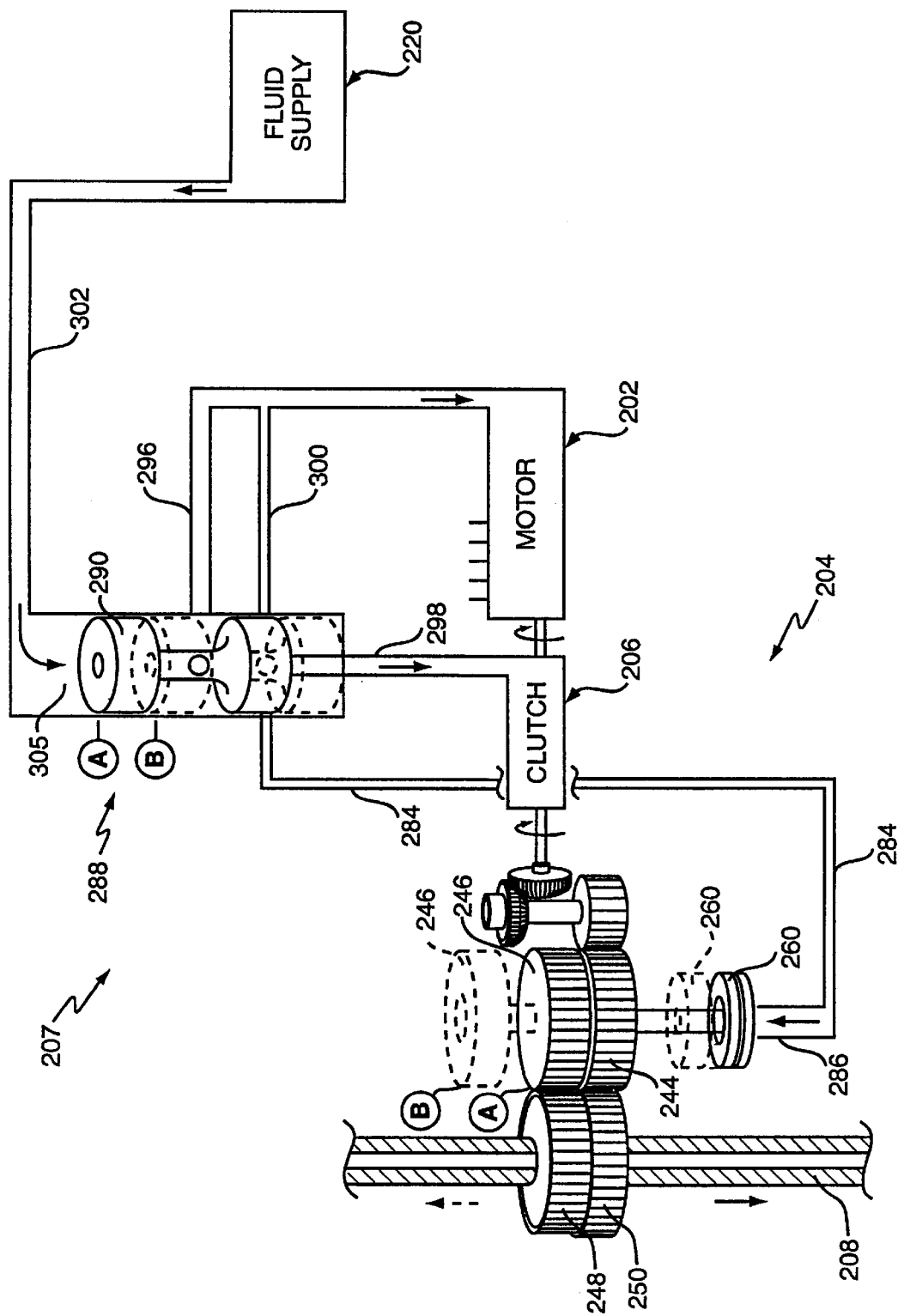
FIG. 8 illustrates a fluid circuit diagram of the right-angle positive feed drill illustrated in FIG. 3.

FIG. 8 illustrates a fluid flow schematic depicting how the actuation device 207 of the positive feed drill 200 causes the piston 260 to move relative to the housing 254 to cause the differential feed gear 246 to disengage from the differential drive gear 244. As illustrated in FIG. 8, the energy supply 220, preferably a fluid supply, such as pressurized air, supplies pressurized fluid to a valve 288. The valve 288 is part of the actuation device 207 that causes the differential feed gear 246 to disengage from the differential drive gear 244 to cause the spindle 208 to retract. The valve 288 is essentially a lid or cover to an aperture that opens a communication for a liquid or gas in one direction, closes it in another direction, or regulates the amount of flow, either manually or automatically. A preferred valve is the spool or piston valve 288 illustrated in FIGS. 8 and 10, and described in further detail below. Although the spool valve 288 is preferred, other valves are contemplated. For example, the valve 288 may be a bib valve, ball valve, butterfly valve, check valve, clack valve, flap valve, gate valve, needle valve, poppet valve, rotary valve, a plurality of different valves, etc. The preferred piston valve 288 illustrated in FIGS. 8 and 10 controls the flow of fluid through a cylindrical bore by moving a close-fitting cylindrical piston 290. As illustrated in FIG. 8, pressurized fluid from the fluid supply 220 is supplied to the interior of the cylindrical bore in which the piston 290 is movable.

When the piston 290 is in the location illustrated by the solid lines in FIG. 8, pressurized fluid is supplied through the fluid inlet 302 to the interior of the valve 288 and out of the power supply channel 296. As illustrated by FIG. 8, the power supply channel 296 supplies pressurized fluid to the motor 202, which in turn rotates the gears in the drive train 204. Hence, rotation of the motor 202 causes a shaft of the clutch 206 to rotate which in turn rotates the previously described gears so as to rotate the differential drive gear 244 to cause the spindle 208 to feed as illustrated by the solid arrow in FIG. 8. Thus, during normal feeding of the spindle 208, the piston 290 of the valve 288 is located in the position illustrated by the solid lines in FIG. 8.

The dashed lines illustrated in FIG. 8 illustrate the location of the components of the positive feed drill 200 when a high torque situation develops during operation of the positive feed drill 200. As shown in FIG. 8, when a high torque situation develops, the clutch 206 will move a trip rod 298. When the trip rod 298 is moved as illustrated in FIG. 8, the piston 290 of the valve 288 will also move from the position shown by the solid lines (position A) to the position illustrated by the dashed lines (position B). This is because the trip rod 298 is attached to the piston 290. However, the trip rod need not be attached to the piston 290. For example, a plurality of canes, arms or other mechanisms may be actuated or actuate each other to cause the piston 290 to move. When the piston 290 is moved to the position illustrated by the dashed lines in FIG. 7, the valve 288 will supply pressurized fluid to both a retract line 284 and a secondary power supply channel 300. As described further below, the piston 290 of the preferred spool valve 288 blocks the secondary power supply channel 300 and the retract line 284 when the piston is unactuated. Additionally, the piston 290 of the preferred valve 288 blocks the power supply channel 296 when the piston is actuated. Thus, when the piston 290 of the valve 288 is located in position B, pressurized fluid is supplied to the motor 202 through the secondary power supply channel 300, which is more restrictive than the power supply channel 296. However, the motor 202 will still continue to drive the differential drive gear 244 as described earlier. Additionally, when the piston 290 of the valve 288 is located at position B, pressurized fluid is also supplied to the retract line 284. The retract line 284 is in communication with the cylinder 280 illustrated in FIGS. 6 and 7. Thus, when the valve 288 is actuated, pressurized fluid is supplied to the bottom of the piston 260 so as to cause the differential feed gear 246 to move from position A to position B illustrated in FIG. 8.

As described earlier, when the differential feed gear 246 is moved from position A to position B, the differential feed gear will disengage from the differential drive gear 244 so as to cause the spindle 208 to retract as shown by the dashed arrow in FIG. 8. Hence, the actuation device 207 according to the preferred embodiment of the present invention includes the clutch 206, the trip rod 298, the valve 288, and pneumatically actuated piston 260 connected to the differential feed gear 246. It can thus be said that the clutch 206 is operatively associated with the differential feed gear 246 so as to cause relative motion between the differential feed gear 246 and the differential drive gear 244, preferably to move the differential feed gear 246 from position A to position B when the clutch 206 trips in response to a high torque situation.

Figure 9:
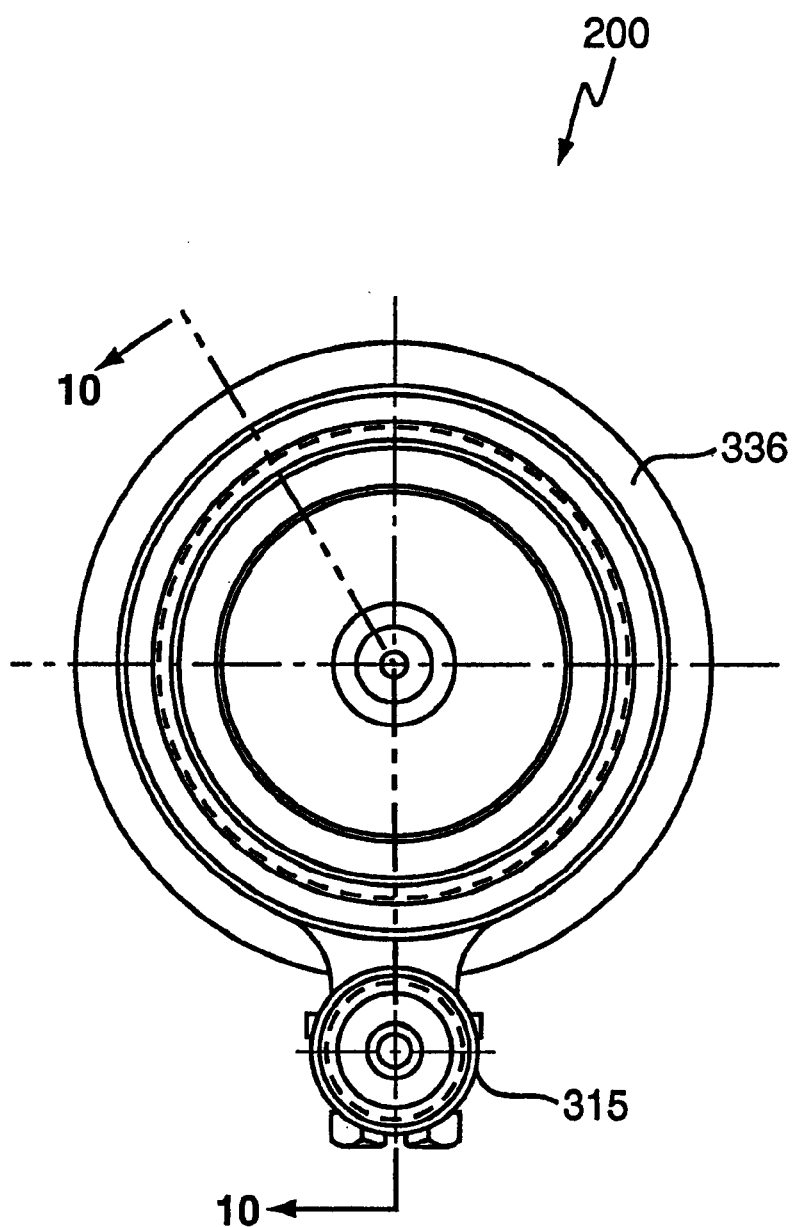
FIG. 9 illustrates an end view of the right-angle positive feed drill illustrated in FIG. 3.
Figure 10A:
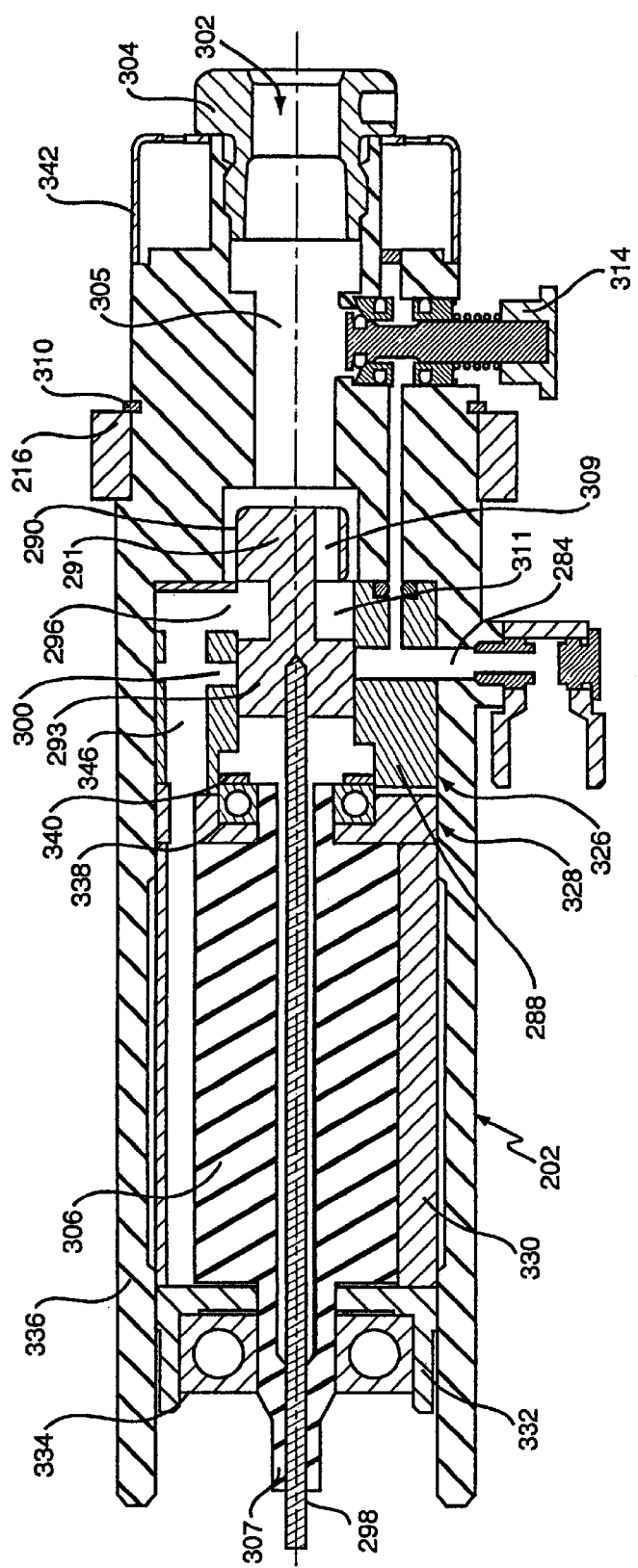
FIG. 10A is a partial sectional view of the rear of the right-angle positive feed drill illustrated in FIG. 3, where the valve of the drill is shown in its unactuated position.
Figure 10B:
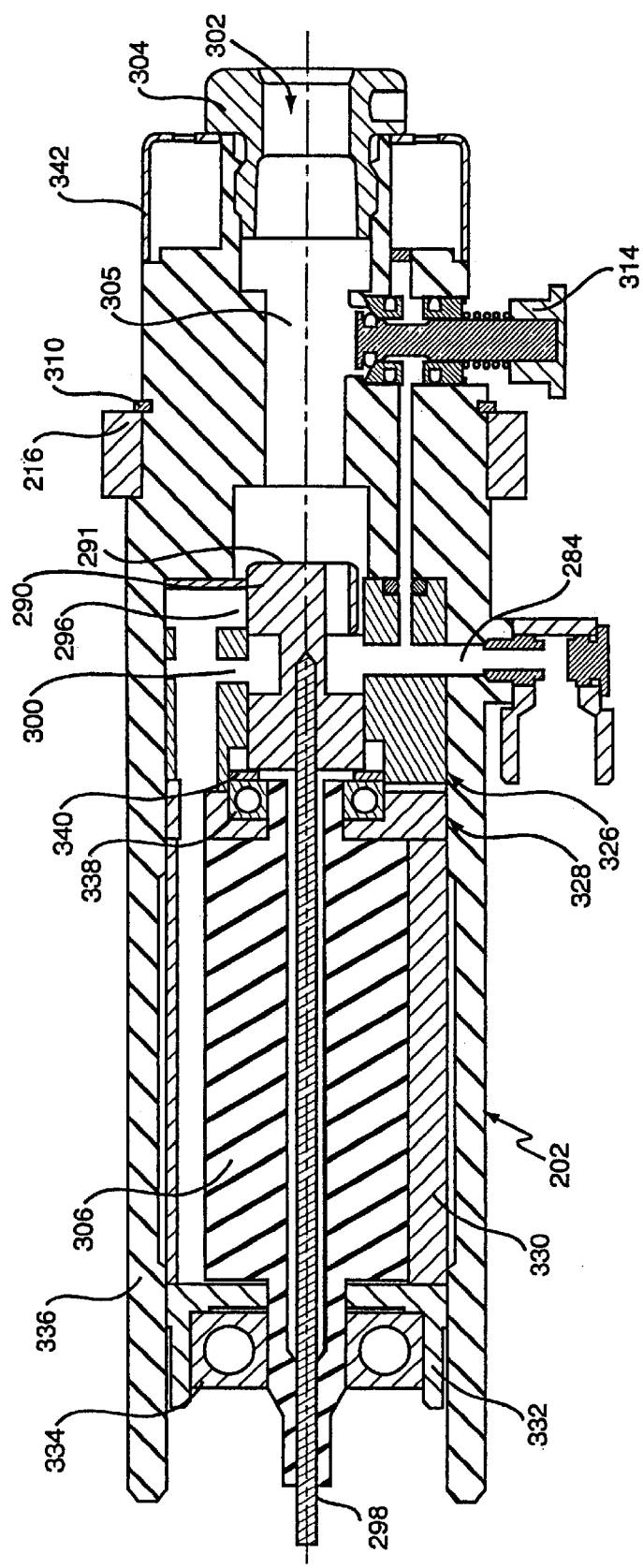
FIG. 10B is a partial sectional view of the rear of the right-angle positive feed drill illustrated in FIG. 3, where the valve of the drill is located in its actuated position.

FIG. 9 illustrates an end view of the rear of the positive feed drill 200, and FIGS. 10A and 10B illustrate a partial cross section of the rear portion of the positive feed drill 200, taken along the line 10—10 of FIG. 9. Referring to FIGS. 5 and 9, the rear housing or back head housing 336 of the positive feed drill 200 includes a cylindrical cavity that receives the motor 202 as well as the previously described valve 288. The rear housing 336 defines part of the overall housing 254 of the right angle positive feed drill 200. Thus, in the preferred embodiment of the present invention, the housing 254 of the tool is defined by multiple connected housing sections. However, it will be appreciated that the housing 254 of the tool 200 can be formed from one piece.

In the preferred embodiment, as shown in FIGS. 10A and 10B, the motor 102 is an air driven or pneumatic motor, similar to that used in Quackenbush Positive Feed Drill Model Nos. 230QGDA-RAC-SU-MS and 15QDA-RAB-SU-RS, commercially available from Cooper Power Tools, Houston Operation, Houston, Tex., USA. The air motor 202 is preferably nonreversible, and the tool 200 is thus not capable of rapidly advancing the spindle 208. However, the motor 202 may be reversible such that the right angle positive feed drill 200 includes the ability to rapidly advance the spindle 208. This feature of positive feed drills is disclosed in both U.S. Pat. Nos. 4,799,833 and 4,591,299. The air motor 202 includes a rotor 306 having rotor blades that are pneumatically driven to cause the motor shaft 307 to rotate. As also illustrated in FIGS. 5 and 10, the positive feed drill 200 includes a fluid inlet 302 contained in a connector 304 or inlet bushing. Fluid pressure admitted through the connector 304 is communicated into an enclosed chamber 305 where it is exposed to the face of the throttle and shut off valve 303 (see FIG. 5), which is controlled by the throttle 216 (the portion of the throttle valve in the chamber 305 has been omitted from FIG. 10 for purposes of clarity). The throttle 216 cooperates with the valve 303 to control the fluid flow into the chamber 305, which in turn feeds the power supply passageway 296 for supplying air into the motor inlet port 346 defined by a rear bearing plate 328 of the motor 202. The opening and closing of the valve 303 is governed by the rotatable throttle ring 216. Air is exhausted from the motor 202 through an exhaust deflector 342 by passageways not illustrated in the figures.

Figure 11:
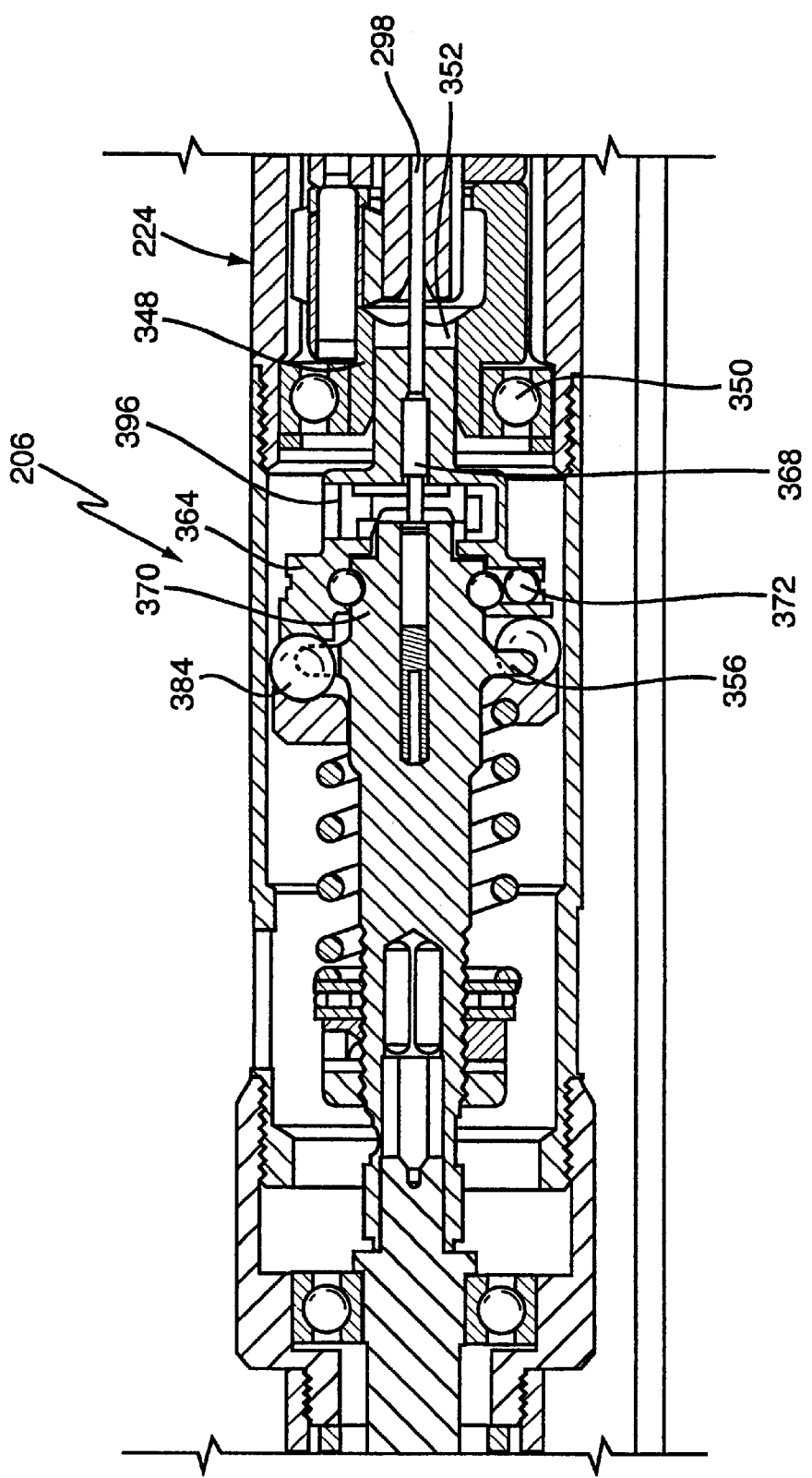
FIG. 11 is a partial sectional view of the middle portion of the right-angle positive feed drill illustrated in FIG. 3, where the clutch of the drill is actuated.

The motor 202 is connected to the planetary gear train 224 illustrated shown in FIG. 11, the output of which is represented by a shaft 348 journaled in a ball bearing assembly 350. The planetary gear train 224 forms part of the overall gear train 204 of the positive feed drill 200. However, it is not necessary that the drill 200 include the specific planetary gear train 224 or even any planetary gear train, depending upon the specific application for the tool and the desired speed reduction.

The shaft 348 includes a central axial bore 352 of hexagonal cross-section that slidably receives a hexagon input stub shaft 354 of the clutch 206, and defines a rotation driving interlock therebetween (see FIGS. 11 and 12). Clutch output, as will be described further below, is through radially extending annular flange 356 integral with a rearward reduced diameter portion 358 of a clutch shaft 360. The shaft portion adjacent the radial extending flange 356 is further reduced at its terminal end at which is formed a cam actuating member 406 having a cam actuating cross-section, such as a polygonal cross-section.

The clutch 206 further includes a body 364 having a central bore 362 (FIG. 14) that slidably receives section 368 of the throttle rod or trip rod 298. A counter bore 366 receives a portion of the clutch shaft 360, to which it is axially coupled but rotatably free by means of a plurality of small diameter balls 372. The balls 372 are adapted to seat between the annular shaft groove 374 and a corresponding annular clutch groove formed on the interior surface of the clutch body 364 (see FIGS. 11 and 16). The balls 372 are supplied for that purpose through a radial bore where they are retained by means of an encircling spiral type spring retainer 376.

To transmit drive from the motor output to the clutch shaft 360, the clutch includes a cam 378 having a plurality of lobes 380. The lobes 380 extend axially toward the clutch shaft 360 at angularly displaced intervals radially outward of the shaft 360. FIG. 13 illustrates a sectional profile of two lobes 380 on the cam 378. The cam 378 is axially recessed at 382 between intermediate adjacent lobes 380. Each of the recesses 382 receives a hardened steal ball 384 when the clutch has not been tripped or actuated. At its circumferential ends, each recess 382 forms a rise of gradual pitch to the next lobe 380, as illustrated in FIG. 13. The balls 384 resting against the cam 378 each extend into one of a plurality of radial open slots 386 formed in the shaft flange 356. The slots 386 are angularly matched to the location of the cam recesses 382.

For radially confining the balls 384, while maintaining coupling engagement between the cam 378 and the flange 356, a cup-shaped ball cage retainer 388 is constantly urged axially toward the body 364 by means of a coil spring 390. The spring 390 is axially compressed between the cage retainer 388 and a washer assembly 390. The washer assembly 390 includes a follower 392 that is axially slidable along the shaft 360, but is rotationally secured to the shaft by means of opposite keys 394. From the foregoing, it will be appreciated that the balls 384 rotationally couple the body 364 to the clutch shaft 360. Upon encountering a turning torque resistance, such as 5–50 inch-lbs, preferably 20–46 inch-lbs, and more preferably 26 inch-lbs during operation of the positive feed drill 200, relative rotation begins to occur between the flange 356 and the can 378. At this point, each ball 384 follows its respective cam rise between two lobes 380, as illustrated by the arrow in FIG. 13, which forces the cage retainer 388 increasingly away from the cam 378 in opposition to the spring 390 until coupling disengagement results, i.e., when the balls 384 roll over the lobes 380. When the balls roll over the lobes 380, the clutch is tripped, actuated, or disengaged. Hence, when the balls 384 roll over the lobes 380, the clutch 206 will limit transmission of power from the motor 202 along the drive train 204 of the positive feed drill 200.

Concomitantly operative with the clutch but operable independently of the disengagement of the clutch for effecting power interruption is a radially movable plunger, such as the sear or release pin 396. The release pin 396 is located in a radially extending cylindrical cavity 398 of the body 364. The release pin 396 is generally cylindrical and is located such that its centroid location is radially displaced from the longitudinal axis of the clutch 206. To achieve centroidal displacement, the release pin 396 as it appears includes a relatively small top mass 400 and a comparatively large bottom mass 402. Likewise, as arranged, the pin 396 includes a lateral bore 404 axially parallel to the longitudinal axis of the clutch 206 and of a diameter sufficient when appropriately positioned to slidably pass the diameter of the trip pin 298 and the trip pin section 368. A spring 406 is also located within the bore 398 and urges the release pin 396 such that the body of the release pin prevents the trip pin section 368 from moving in toward the clutch shaft 360.

FIG. 15 illustrates a partial sectional view of the release pin 396 in a position where it prevents the trip pin section 368 from passing through the lateral bore 404. As shown in FIG. 15, the release pin 396 prevents leftward movement of the trip pin section 368. Because the remainder of the trip pin 298 is urged toward and abuts against the section 368, the pin 396, in effect, prevents the trip pin from moving toward the clutch shaft 360 when the pin 396 is in the position illustrated in FIG. 15. With the mass center of the pin 396 being located away from the center of the body 364, a centrifugal force generated by tool rotation acts to continuously force the release pin 396 in a direction aided by the spring 406 for maintaining the release pin 396 in a position where it blocks or prevents the trip pin section 368 from entering through the lateral bore 404 of the release pin 396. However, when clutch disengagement occurs on the set torque being encountered, which permits rotation of the clutch shaft 360 relative to the motor output being supplied to the clutch 206, the same relative rotation transmits a parallel reaction by lobe 407 of cam actuating member 406.

FIG. 17 illustrates the lobes 407 of the cam actuating member 406, where one of the lobes 407 is actuating the retaining pin 396. That is, the lobes 407 of the shaft end will engage a surface of the retaining pin 396 to shift the pin radially against the spring 406 as shown in FIGS. 16 and 17. On shifting of the pin 396, the axis of the bore 404 is similarly shifted to permit the trip rod section 368 to enter into and through the bore 404, permitting axial, leftward movement of the trip rod 298. With the pin 396 thus positioned, fluid force acting on the back side 291 of the piston 290 of the valve 288 forces the trip rod 298 and the thus the trip rod section 368 leftward to compress the spring 408 until the piston 290 of the valve 288 seats. The spring 390 then acts to reset the clutch balls 384 within their respective cam recesses 382. However, the valve 288 will remain in the actuated position and the trip rod 298 will remain actuated while the clutch continues to trip and the balls 384 roll over the surfaces of the cam 378. In this manner, the clutch 206 causes the valve 288 to actuate, which causes the differential feed gear 246 to disengage from the differential drive gear 244, which causes the positive feed drill 200 to automatically retract the spindle 208. The clutch 206 will not reset (the trip pin 298 will not move back to its unactuated position) until the fluid pressure in the tool 200 has been relieved, such as when the throttle 216 is shut off.

To preset the torque at which clutch disengagement is to be effected, the clutch 360 includes an adjustment nut 410 that is threaded on the clutch shaft 360. The nut 410 has a serrated radial end that faces toward angularly displaced pockets on the back side of the spring follower 392. By means of the opening 225 (see FIG. 4) formed in the housing of the tool 200 in the vicinity of the nut 410, access is provided to the nut 410 whereby a screwdriver end or the like can be inserted into an adjacent nut serration so as to rotate the nut. Additionally, the nut 410 can be held still with a tool while the spindle is manually rotated, which will cause the nut 410 to thread further on or off of the threads 361 on the clutch shaft 360. Rotating the nut 410 in either direction will thereby threadably advance or withdraw the nut along the clutch shaft 360. This respectively increases or decreases the force applied by the cage retainer 388 to keep the balls 384 in the recesses between the lobes 380 of the cam 378, which increases or decreases the predetermined amount of torque at which the clutch 206 trips or is actuated. Hence, the spring 390 maintains the desired coupling force that must be overcome to effect clutch disengagement between the shaft flange 356 and the clutch cam 378. The torque required to retract the spindle 208 is preferably lower than that required to feed the spindle, and is also lower than that required to trip the clutch 206. However, if the torque required to retract the spindle is higher than that required to trip the clutch, the clutch 206 can be configured to produce greater torque after being actuated such that the spindle will retract.

Additionally, to increase the likelihood that the clutch 206 will trip in response to the stop collar 256 bearing on the housing 254 when the spindle 208 is feeding, the spindle of the preferred tool 200 includes a 16 pitch double threaded coarse thread. However, the spindle 208 can have other threaded configurations and still function as contemplated herein. For example, the spindle 208 can have fine threads and different pitch threads.

During operation of the right angle positive feed drill 200, the output shaft 348 is caused to rotate by the motor 202 whereby through its connection with the clutch stub shaft 354, drive is transmitted to the clutch shaft 360. By virtue of engagement force imposed by the spring 390, clutch balls 384 are restrained against the rise of the cam pitch 378 thereby transmitting the driving force through flange 356 to the shaft 360 and eventually to the spindle 208 as previously described.

When the spindle 208 or any item in the drive train 204 reaches the predetermined set torque, the turning resistance exerted while the motor 202 continues to operate affords relative rotation between the cam 378 and the flange 356, forcing the balls 384 of the spring loaded assembly axially forward along the cam rise illustrated in FIG. 13. Axial ball movement in turn forces retainer cage 388 rearwardly in opposition to the force of the spring 390. With relative movement occurring there between, the pin 396 is shifted by the reaction of shaft lobes 407 against the surface 412 of the pin 396, as shown in FIGS. 15–17. When this occurs, the pin slot 404 is repositioned in the cavity 398 until more nearly axially coincident with the trip rod section 368, permitting unimpeded axial movement of the trip rod 298. With trip rod interference removed, fluid force acting against the piston 290 of the valve 288, which may be aided by the force of a spring, urges the valve 288 in opposition to the spring 408 to its retract mode position against a seat defined by a spacer 340, illustrated in FIG. 10. Fluid flow is then immediately rerouted according to the fluid diagram illustrated in FIG. 8, as previously described. The previously described clutch 206 is described in further detail in U.S. Pat. No. 3,766,990, the entire disclosure of which is hereby incorporated by reference. A suitable clutch for the positive feed drill would include clutches such as the Clecomatic clutch commercially available from Cooper Power Tools, Houston Operation, Houston, Tex., USA.

Figure 14:
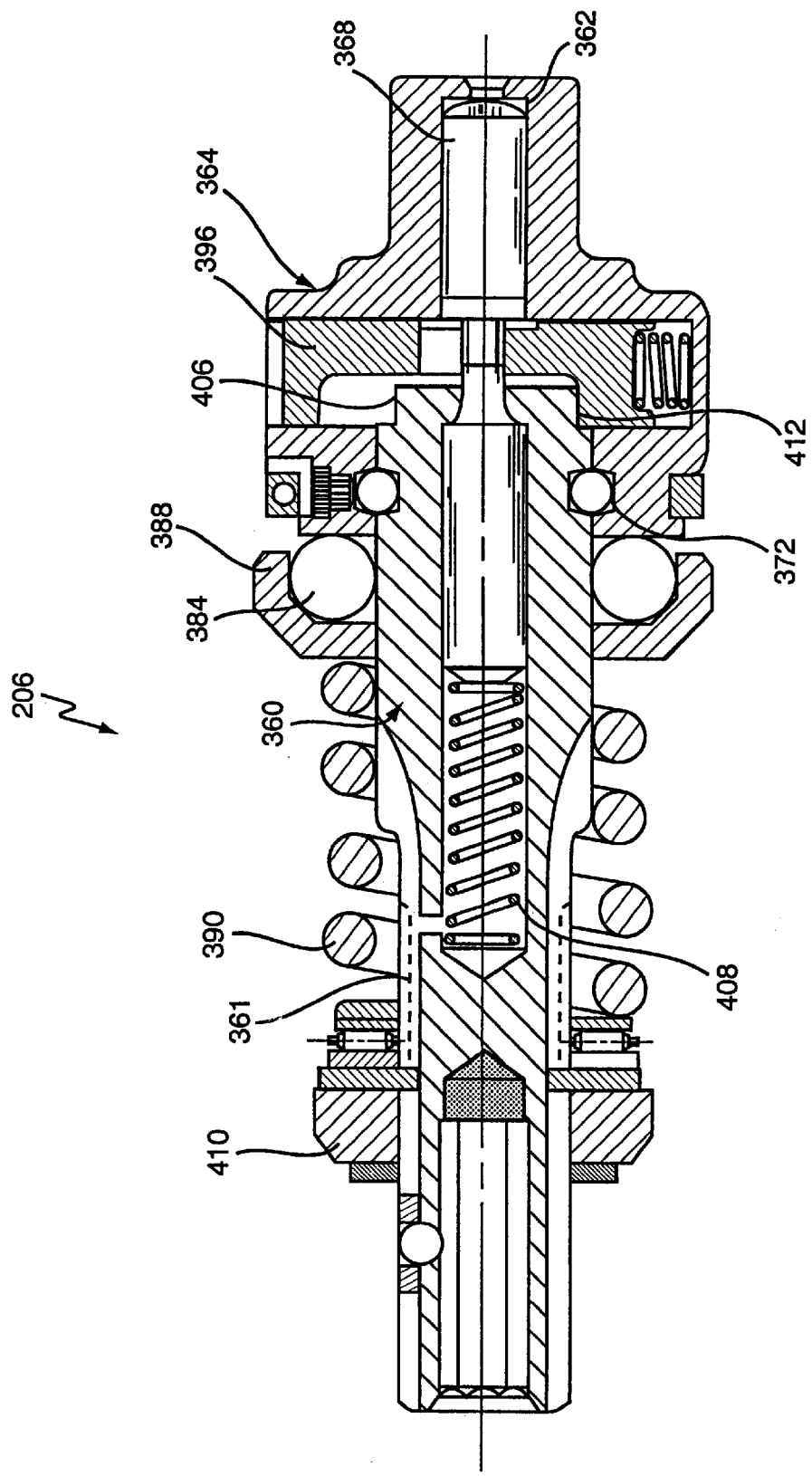
FIG. 14 is a partial sectional view of the clutch of the right-angle positive feed drill illustrated in FIG. 3.

Referring again to FIGS. 10A and 10B, operation of the valve 288 will be described in further detail. FIG. 10A illustrates the valve in the unactuated position, where the piston 290 of the valve is located toward the rear of the back head housing 336 having the connector 304. When the valve 288 is in the unactuated position illustrated in FIG. 10A, the clutch 206 has not been actuated and thus the trip pin 298 has not been actuated to move toward the clutch 206, specifically into the chamber 363. Thus, the piston 290 of the valve 288 is in the position where the trip rod is unactuated as illustrated in FIGS. 11, 14 and 15. Preferably, the piston 290 of the valve 288 is threaded to the trip rod 298 such that the piston 290 moves when the trip rod moves. However, the piston 290 may be integral with the trip rod 298, or may be attached to the trip rod 298 by other mechanisms.

As shown in FIG. 10, the valve 288 is preferably a piston or spool valve, having a piston 290 that has been relieved or undercut about the outside diameter to allow passage of fluid, such as air. Hence, the piston 290 includes two cylindrical sections 291, 293 with a rod-like section there between. The piston 290 slides over cylindrical ports in a close-fitting valve body 326. The first piston section 291 of the piston 290 includes a port 309 through which pressurized fluid from the fluid inlet 302 may enter the annular passageway 311 located between the first and second piston sections 291, 293 of the piston 290. Because the passageway 309 communicates the fluid inlet with the annular passageway 311, and the annular passageway 311 is located directly adjacent to the power supply channel 296 when the valve is unactuated, pressurized fluid will flow from the fluid inlet 302 through the port 309 to the annular passageway 311 and to the power supply channel 296. The power supply channel 296 is thus partially defined by a passageway in the valve body 326 that is in communication with the inlet port 346 in the rear bearing plate 328 of the air motor 202. The rear bearing plate 328 communicates air from the power supply channel 296 to the inlet of the air motor 202 so as to cause the rotor 306 to rotate, as is conventionally known.

As also illustrated in FIG. 10A, when the piston 290 is unactuated, the piston 290 will block the secondary power supply channel 300 as well as the retract supply line 284. The retract supply line 284 is partially formed in the valve body 326 and extends through the back head housing 336 to the exterior of the housing. Thereafter, the retract supply line 284 is defined by a tubing or conduit 315 extending from the rear end of the tool 200 to the bore 280 underneath the piston 260 for causing the differential feed gear 246 to disengage from the differential drive gear 244. However, the retract supply line 284 need not extend outside the housing of the tool 200. For example, the interior of the tool 200 could have a plurality of passageways that define the retract supply line 284.

The valve body 326 includes a plurality of passageways formed therein that define various fluid supply routes to the motor 202 as well as to the underside of the piston 260, as described further below. The valve body 326 is located within a bore in the back head housing, preferably concentric to the bore in which the rotor 306 of the motor 202 is located.

As illustrated in FIGS. 10A and 10B, the tool 100 preferably also includes a retract valve 314, which may be actuated to cause the spindle 208 to retract. The retract valve 314 is described in further detail in U.S. Patent Application entitled "Positive Feed Tool Having a Retract Valve", filed Jun. 18, 1999, the entire disclosure of which is hereby incorporated by reference.

When the clutch 206 is actuated as described earlier, the piston 290 will move from the unactuated position illustrated in FIG. 10A to the actuated position illustrated in FIG. 10B. This is because the trip rod 298 is permitted to move toward the front of the tool, specifically toward the clutch shaft 360. Fluid force acts on the rear side of the piston 290, forcing the trip rod 298 to move forward. Because the trip rod 298 is attached to the piston 290, the piston will move when the trip rod moves. However, it will be realized that the piston 290 will still move when the trip rod is actuated, even if the trip rod is not attached to the piston. As discussed earlier, the piston 290 is biased toward the front of the tool by pressurized fluid that has entered the fluid inlet 302 during operation of the tool. When the valve 288 is actuated such that the piston moves from the position illustrated in FIG. 10A to the position illustrated in FIG. 10B, the piston 290 will operate to effectively block or seal the port in the valve body 326 to the power supply channel 296. However, when the piston 290 is actuated such that it is in the position illustrated in FIG. 10B, the pressurized fluid from the fluid inlet 302 will enter through the port 309 into the annular chamber 311, but then travel through both the secondary power supply channel 300 as well as the retract supply line 284. The piston 290 is fully actuated when the piston 290 abuts against the spacer 340 located directly against a bearing 338 in the rear bearing plate 328.

Hence, when the torque exceeds the adjustable torque limit of the clutch 206, the balls 384 roll up the lobes in the clutch and overcome the spring rate of the spring 390. This permits the trip rod 298 to move forward and shift the valve piston 290, allowing air to port through the retract supply line 284 to the right angle head 222 of the tool 200. Air under the piston 260 urges the differential feed gear 246 away from the differential drive gear 244, overcoming the spring rates of the springs 255, 257, which in turn causes the differential feed gear 246 to be locked or prevented from rotating by the protrusions 258, 268, or other similar elements. Since air is still supplied to the motor 202 via the port 300, the differential drive gear 244 will rotate as described earlier causing the spindle 208 to retract.

As previously described, the clutch 206 will trip when the spindle stop collar 256 bears against the right angle housing head 254 or any other sturdy component. Additionally, the clutch 206 will trip when the spindle 208 or a cutter attached thereto is subjected to a high torque. Likewise, the clutch 206 will trip when the spindle 208 or cutter are subjected to a thrust situation that in turn increases the torque on the spindle. Furthermore, because the clutch 206 is located in the drive train 204 between the motor 202 and the spindle 208, the clutch 206 will actuate when worn, damaged, or under lubricated gears, bushings, bearings, or shafts within the drive train 204 create a high torque situation. In this manner, the clutch 206 protects the cutter, spindle, gears, bearings, shafts, other drive components, as well as the motor and the workpiece, when the spindle 208 or drive train 204 are subjected to a high torque situation.

Additionally, in the drilling mode, the differential feed gear 246 is spring loaded downward through retract piston shaft 262 so that the protrusions 281 on the bottom of the differential feed gear 246 will engage the slots in the differential drive gear 244 to cause these two gears to rotate in unison. When the throttle 216 is actuated, the spindle 208 will rotate and feed. During normal feeding, when the clutch 206 trips, automatic piston 290 moves forward and supplies pressurized fluid, preferably pressurized air, through the retract supply line 284 to move the retract piston 260, the retract piston shaft 262, and the differential feed gear 246 upward in unison. For the right angle positive feed tool 200, air is preferably supplied so that when the tool 200 is running the dynamic pressure at the inlet of the tool is roughly 90 psig. Automatic retract piston 290 in the forward position also restricts flow of pressurized fluid to the motor 202 because the port in the valve body 326 for the secondary power supply channel 300 is smaller in cross-section than that for the power supply channel 296, thus reducing the motor speed. Reduced motor speed has advantages when the spindle 208 retracts, primarily because the tool will retract more slowly when aggressive feed rates are used. This also produces less torque, which prevents jamming of the spindle retract stop collar against the head.

When the differential feed gear 246 is in the upward position it will engage the protrusions 258, which can be spring-loaded, to prevent rotation of the differential feed gear 246 and cause the rotating spindle 208 to retract. The balls 384 of the clutch 206 may or may not be repeatedly riding over the lobes 380, such that the clutch is "chattering".

When the throttle 216 is manually shut off, the clutch 206 and trip rod 298 will reset because the spring 408 in the clutch 206 will force the piston 290 back toward the rear of the tool as the fluid pressure in the tool is relieved and no longer biases the piston 290 toward the head of the tool. Because the differential feed gear 246 is spring loaded downward, it will move and engage the differential drive gear 244 once again. When the throttle 216 is manually opened again, the drilling cycle will begin anew.

The incorporation of the clutch 206 in the tool protects the cutter, drill, and workpiece from inadvertent damage. It also provides a number of automated features without significantly increasing the head size, using pneumatic power typically associated with such positive feed drills. The previously described torque sensing feature of the tool 200 results in cost reductions associated with cutter damage, rework, repair, and maintenance.

The principles, the preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed without departing from the spirit of the present invention. Accordingly, it is expressly intended that all such variations, changes, and equivalents which fall within the spirit and scope of the present invention as defined in the claims be embraced thereby.

We claim:

1. A positive feed tool, comprising:
   a threaded spindle;
   a motor; and
   a drive train that rotatably connects said motor and said threaded spindle, said drive train at least including:
   a spindle drive gear coupled to said spindle such that said spindle and said spindle drive gear rotate together;
   a spindle feed gear threaded on said spindle;
   a differential drive gear engaged with said spindle drive gear;
   a differential feed gear engaged with said spindle feed gear, at least one of said differential feed gear and said differential drive gear being moveable from a first position to a second position, said differential feed gear being coupled to said differential drive gear when said one of said differential feed gear and said differential drive gear is located at said first position such that said differential feed gear and said differential drive gear rotate together, said differential feed gear not being coupled to said differential drive gear when said one of said differential feed gear and said differential drive gear is located at said second position; and
   a clutch for limiting transmission of power from said motor along said drive train when torque on said spindle or in said drive train exceeds a predetermined value and when said one of said differential feed gear and said differential drive gear is located at said first position.

2. The positive feed tool of claim 1, wherein said clutch is operatively associated with said differential feed gear to move said differential feed gear from said first position to said second position when torque on said spindle or in said drive train exceeds said predetermined value.

3. The positive feed tool of claim 2, further comprising:
   a fluid supply channel for supplying pressurized fluid to said motor;
   a piston connected to said differential feed gear;
   a fluid line for supplying pressurized fluid to said piston from said fluid supply channel;
   a valve located between said fluid line and said fluid supply channel;
   said clutch being operatively associated with said differential feed gear by at least said valve and said piston, said valve being actuatable by said clutch when torque on said spindle or in said drive train exceeds said predetermined value, said valve communicating said fluid supply channel and said fluid line when said valve is actuated by said clutch to cause said piston to move said differential feed gear from said first position to said second potion.

4. The positive feed tool of claim 3, further comprising a trip pin, said clutch being operatively associated with said differential feed gear by at least said trip pin, said clutch including a recess and a plunger, said trip pin being biased toward said recess during operation of said drill, said plunger for preventing said trip pin from entering said recess when torque on said spindle or in said drive train exceeds said predetermined value, said clutch including a device for moving said plunger relative to said trip pin when torque on said spindle or in said drive train exceeds said predetermined value such that said plunger does not prevent said trip pin from entering said recess, said trip pin for actuating said valve when said plunger moves and said trip pin enters said recess.

5. The positive feed tool of claim 3, further comprising a housing for housing components of said tool, said fluid line being located at least partially external of said housing, said piston being moveable relative to said housing.

6. The positive teed tool of claim 1, further comprising a housing for housing components of said tool, said clutch being located within an interior of said housing and being located between said differential drive gear and said motor.

7. The positive feed tool of claim 1, further comprising a bevel gear assembly and an idler gear located between said clutch and said differential drive gear for transmitting rotation of a shaft of said clutch to said differential drive gear.

8. The positive feed tool of claim 1, wherein said clutch includes a spring loaded roller assembly for at least partially preventing the transmission of power from said motor along said drive train when torque on said spindle or in said drive train exceeds said predetermined value.

9. The positive feed tool of claim 1, wherein said motor includes an air motor.

10. The positive feed drill of claim 1, wherein said tool is a right angle positive feed drill.

11. A positive feed tool, comprising:
    a spindle;
    a motor;
    a drive train rotatably connecting said motor and said spindle; and
    means for causing said spindle to retract when torque on said spindle or in said drive train exceeds a predetermined value.

12. The positive feed tool of claim 11, wherein said drive train includes at least a portion of said retract means.

13. The positive feed tool of claim 11, wherein said retract means includes a clutch, said clutch limiting transmission of power from said motor along said drive train when torque on said spindle or in said drive train exceeds a predetermined value.

14. The positive feed tool of claim 11, wherein said retract means includes means for disengaging said differential feed gear from said differential drive gear to cause said spindle to retract.

15. A method in a positive feed tool having a spindle, a motor, a drive train rotatably connecting the motor to the spindle, the drive train having a clutch and a differential feed gear engageable with a differential drive gear, the method comprising:

feeding the spindle while the differential feed gear is engaged with the differential drive gear, and retracting the spindle by automatically disengaging at least one of the differential feed gear and the differential drive gear from the other of the differential feed gear and the differential drive gear when an amount of torque on the spindle or in the drive train exceeds a predetermined value and causes the clutch to limit transmission of power from the motor along the drive train.

16. The method of claim 15, wherein the differential feed gear is disengaged from the differential drive gear by pneumatically moving a piston that moves the differential feed gear.

17. The method of claim 16, wherein the piston is pneumatically moved by opening an air valve.

18. The method of claim 17, wherein the clutch actuates a trip pin when the clutch limits transmission of power from said motor along said drive train, said actuation of the trip pin causing the air valve to open.

19. The method of claim 15, further comprising changing the predetermined value.

20. The method of claim 15, wherein the amount of torque on the spindle or in the drive train exceeds the predetermined value when a spindle depth stop bears against a housing of the tool during advancement of a spindle.

21. The method of claim 15, wherein the amount of torque on the spindle or in the drive train exceeds the predetermined value when the spindle is overloaded during drilling.

22. The method of claim 15, wherein the amount of torque on the spindle or in the drive train exceeds the predetermined value when a cutter attached to the spindle is overloaded during drilling.

23. The method of claim 15, wherein the amount of torque on the spindle or in the drive train exceeds the predetermined value when a bushing, bearing, shaft, or gear of the tool is worn, damaged, or underlubricated during operation of the tool.

24. A positive feed tool, comprising:

a threaded spindle;

a motor; and a drive train that rotatably connects said motor and said threaded spindle, said drive train at least including:
        a spindle drive gear coupled to said spindle such that said spindle and said spindle drive gear rotate together;
        a spindle feed gear threaded on said spindle;
        a differential drive gear engaged with said spindle drive gear;
        a differential feed gear engaged with said spindle feed gear, at least one of said differential feed gear and said differential drive gear being moveable from a first position to a second position, said differential feed gear being coupled to said differential drive gear when said one of said differential feed gear and said differential drive gear is located at said first position such that said differential feed gear and said differential drive gear rotate together, said differential feed gear not being coupled to said differential drive gear when said one of said differential feed gear and said differential drive gear is located at said second position;
        a clutch for limiting transmission of power from the motor along the drive train, said clutch being operatively associated with said one of said differential feed gear and said differential drive gear to move said one of said differential feed gear and said differential drive gear from said first position to said second position when said clutch limits transmission of power from the motor along the drive train.

25. A positive feed tool, comprising:

a spindle;

a motor; and a drive train rotatably connecting said motor and said spindle, said drive train including means for preventing transmission of power from said motor along said drive drain when torque on the spindle or torque in the drive train exceeds a predetermined value during feeding of the spindle.

26. A method in a positive feed tool having a spindle, a motor, and a drive train rotatably connecting the motor to the spindle, the drive train having a differential feed gear engageable with a differential drive gear, the method comprising:

feeding the spindle while the differential feed gear is engaged with the differential drive gear, and limiting transmission of power from said motor along said drive train when an amount of torque on the spindle or in the drive train exceeds a predetermined value and when the differential feed gear is engaged with the differential drive gear.

27. A method in a positive feed tool having a spindle, a motor, and a drive train rotatably connecting the motor to the spindle, the drive train including a clutch and a differential feed gear engageable with a differential drive gear, the method comprising:

feeding the spindle while the differential feed gear is engaged with the differential drive gear, and retracting the spindle by pneumatically disengaging the differential feed gear from the differential drive gear when an amount of torque on the spindle or in the drive train exceeds a predetermined value and causes the clutch to limit transmission of power from the motor along the drive train.

* * * * *